US007828220B2

(12) United States Patent
Mullen

(10) Patent No.: US 7,828,220 B2
(45) Date of Patent: Nov. 9, 2010

(54) DYNAMIC CREDIT CARD WITH MAGNETIC STRIPE AND EMBEDDED ENCODER AND METHODS FOR USING THE SAME TO PROVIDE A COPY-PROOF CREDIT CARD

(75) Inventor: Jeffrey David Mullen, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 11/927,688

(22) Filed: Oct. 30, 2007

(65) Prior Publication Data
US 2008/0054079 A1    Mar. 6, 2008

Related U.S. Application Data

(63) Continuation of application No. 11/431,254, filed on May 9, 2006.

(60) Provisional application No. 60/679,498, filed on May 9, 2005.

(51) Int. Cl.
*G06K 19/06* (2006.01)
(52) U.S. Cl. .................. 235/492; 235/449; 235/380
(58) Field of Classification Search ............ 235/380, 235/487, 488, 492, 449
See application file for complete search history.

(56) References Cited
U.S. PATENT DOCUMENTS

| 4,353,064 A * | 10/1982 | Stamm ................. 340/5.61 |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A * | 1/1989 | Hara ..................... 235/380 |
| 5,038,251 A * | 8/1991 | Sugiyama et al. ......... 361/680 |

(Continued)

FOREIGN PATENT DOCUMENTS

JP    05210770 A    8/1993

(Continued)

OTHER PUBLICATIONS

The Bank Credit Card Business. Second Edition, American Bankers Association, Washington, D.C., 1996. All pages.

(Continued)

*Primary Examiner*—Karl D. Frech

(57) ABSTRACT

A dynamic credit card is provided in which a secure credit card number (e.g., a secret/hidden credit card number) is encoded based on a timing signal (e.g., an internal counter) to provide a dynamic credit card number. This dynamic number may be displayed to a user via a display (e.g., so that online purchases can be made) or written onto a magnetic stripe such that the number may be processed by traditional credit card merchants (e.g., swiped). At a remote facility, the dynamic number may be decoded based on time (and/or a counter/key number/equation). Thus, a dynamic credit card number may change continually or periodically (e.g., every sixty seconds) such that credit card numbers may not be copied by thieves and used at later times. A dynamic verification code may also be utilized in addition to, or in lieu of, a dynamic credit card number.

34 Claims, 18 Drawing Sheets

U.S. PATENT DOCUMENTS

| | | |
|---|---|---|
| 5,168,520 A | 12/1992 | Weiss |
| 5,237,614 A | 8/1993 | Weiss |
| 5,276,311 A * | 1/1994 | Hennige .................. 235/380 |
| 5,347,580 A * | 9/1994 | Molva et al. ................ 713/159 |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,657,388 A | 8/1997 | Weiss |
| 5,834,756 A | 11/1998 | Gutman et al. |
| 5,856,661 A | 1/1999 | Finkelstein et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,163,771 A | 12/2000 | Walker et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,769,618 B1 | 8/2004 | Finkelstein |
| 6,776,332 B2 | 8/2004 | Allen et al. |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchley et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,532,104 B2 | 5/2009 | Juels |
| 7,543,739 B2 | 6/2009 | Brown et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,641,124 B2 | 1/2010 | Brown et al. |
| 7,660,902 B2 | 2/2010 | Graham et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0105964 A1 | 6/2003 | Brainard et al. |
| 2003/0116635 A1* | 6/2003 | Taban .................. 235/492 |
| 2003/0152253 A1 | 8/2003 | Wong |
| 2003/0173409 A1* | 9/2003 | Vogt et al. .................. 235/492 |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |

| | | |
|---|---|---|
| 2005/0086160 A1 | 4/2005 | Wong et al. |
| 2005/0086177 A1 | 4/2005 | Anderson et al. |
| 2005/0116026 A1 | 5/2005 | Burget et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0174614 A1 | 7/2007 | Duane et al. |
| 2007/0241201 A1 | 10/2007 | Brown et al. |
| 2007/0192249 A1 | 12/2007 | Biffle et al. |
| 2008/0040271 A1 | 2/2008 | Hammad et al. |
| 2008/0040276 A1 | 2/2008 | Hammad et al. |
| 2008/0096326 A1 | 4/2008 | Reed |
| 2008/0148394 A1 | 6/2008 | Poidomani et al. |
| 2009/0108064 A1 | 4/2009 | Fernandes et al. |
| 2009/0255996 A1 | 10/2009 | Brown et al. |

FOREIGN PATENT DOCUMENTS

| | | |
|---|---|---|
| WO | WO9852735 | 11/1998 |
| WO | WO0247019 A1 | 6/2002 |
| WO | WO2006105092 | 10/2006 |
| WO | WO2006116772 | 11/2006 |

OTHER PUBLICATIONS

A Day in the Life of a Flux Reversal. http://www.phrack.org/issues.html?issue=37&id=6#article. Nov. 22, 1992. All pages.
English translation of JP 05210770 A.
U.S. Appl. No. 60/594,300, filed Mar. 26, 2005, Poidomani et al.
U.S. Appl. No. 60/675,388, filed Apr. 27, 2005, Poidomani et al.

* cited by examiner

600
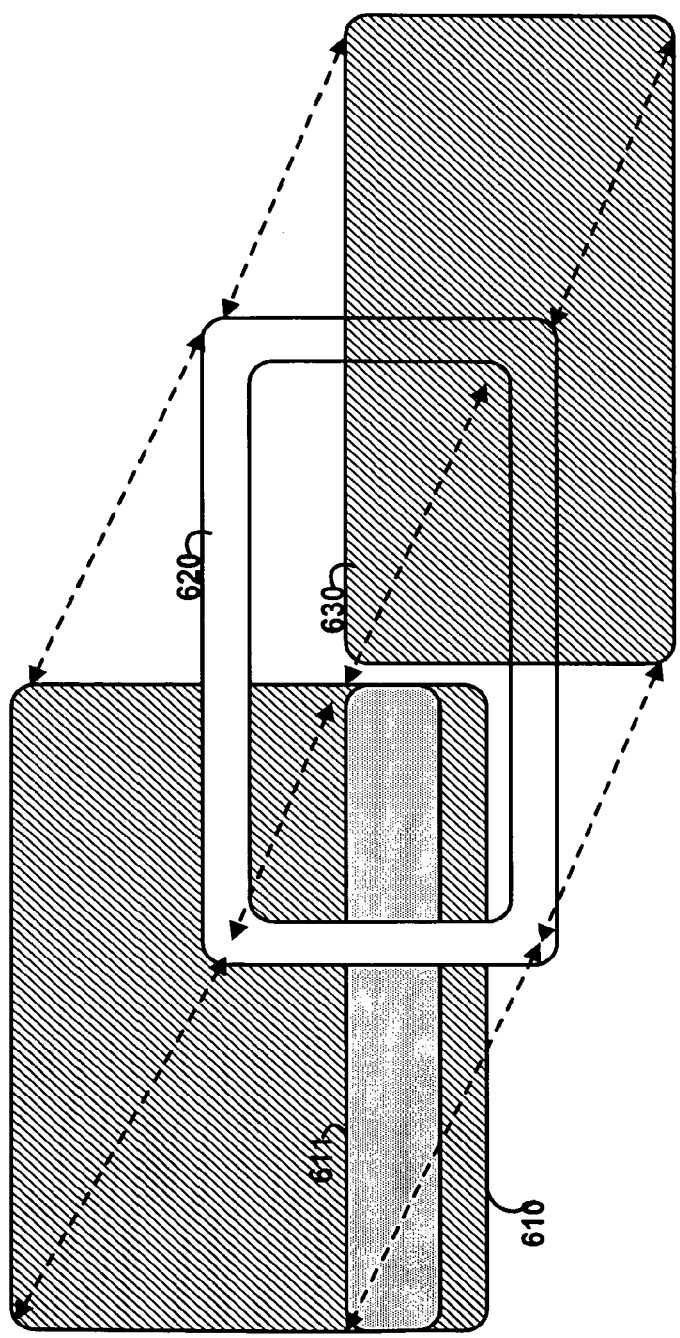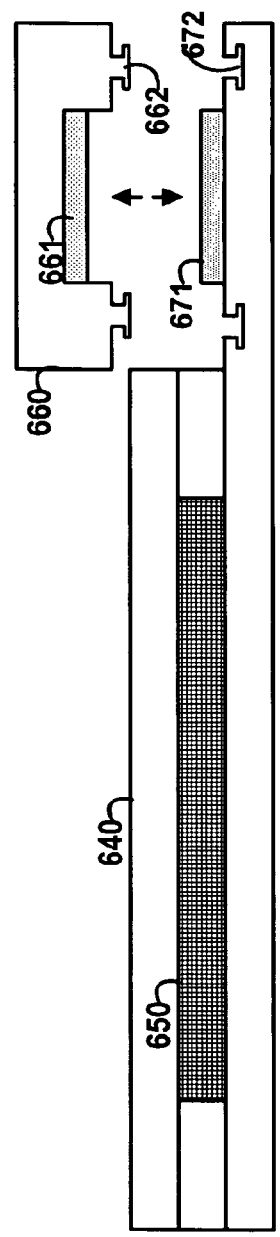
FIG. 6

DYNAMIC CREDIT CARD WITH MAGNETIC STRIPE AND EMBEDDED ENCODER AND METHODS FOR USING THE SAME TO PROVIDE A COPY-PROOF CREDIT CARD

CROSS-REFERENCE TO RELATED APPLICATION

This application is a continuation of U.S. patent application Ser. No. 11/431,254, filed on May 9, 2006, which claims the benefit from U.S. Provisional Patent Application No. 60/679,498, entitled "Dynamic Credit Card With Magnetic Stripe and Embedded Encoder and Methods for Using the Same To Provide A Copy-Proof Credit Card," filed on May 9, 2005, which is hereby incorporated by reference herein in its entirety.

BACKGROUND OF THE INVENTION

This invention relates to credit cards. More particularly, this invention relates to systems and methods for protecting against credit card fraud.

Billions of dollars are lost annually to credit card fraud. Particularly, credit card numbers are copied and used without permission. Copying may take many forms. A thief may, for example, catch a glimpse of an actual credit card and copy the number by writing the number on a piece of paper. Alternatively, a thief may intercept a digital signal representative of the credit card number and utilize such a digital signal at a later time. It is therefore desirable to provide systems and methods that completely eliminate the possibility for such types of credit card fraud.

American Express has introduced a credit card with an embedded smart chip (i.e., a smart card credit card). In doing so, however, American Express had to replace the credit card readers at any establishment (e.g., store) that wanted the capability to read from an American Express smart card. Such smart card credit cards do not solve the problem of copying credit card numbers and using them at a later time—American Express smart cards still employ a visible credit card number. It is therefore desirable to not only eliminate credit card fraud, but do so without having to change any of the hardware that establishments utilize to read credit cards.

Traditional credit cards store information such as a person's credit card number and expiration date on the magnetic stripe of the credit card. The standard for traditional credit cards, however, allows for more information to be written onto the magnetic stripe and read by traditional credit card readers. None of the current credit cards use all of this bandwidth. In fact, some credit card companies write a string of zeroes after a person's name and credit card number to fill such bandwidth. In turn, the readers read and transmit the filler information to credit card authorization facilities. The credit card authorization facilities then discard this filler information. It is therefore desirable to provide a credit card that fully utilizes the bandwidth provided in traditional credit card magnetic stripe standards.

Traditional credit cards that employ magnetic stripes are deficient because the magnetic stripe is highly susceptible to wear and magnetic interference. Particularly, the magnetic stripe can be worn down physically or rewritten/erased by magnetic interference. It is therefore desirable to provide a robust credit card that can withstand wear and is not susceptible to interference.

Timing signals are transmitted throughout the globe. For example, a WWVB atomic clock signal is transmitted from a radio system available in North America that reaches the entire continental United States, a large portion of Canada, and Central America. The signal is transmitted one-bit per second. Fifty three bits and 7 separators transmit the year, day, hour, minute, as well as information on daylight savings time and leap years. Thus, the WWVB signal takes 60 seconds to transmit. DCF time signals and MSF time signals are transmitted throughout Europe. Moreover, the Global Positioning System (GPS) transmits time signals—which are utilized to locate GPS receivers in the world. GPS signals span the entire globe. It is therefore desirable to utilize timing signals in a manner other than to locate a receiver or determine the time of day.

Wong et al. U.S. Pat. No. 6,592,044 titled "Anonymous Electronic Card For Generating Personal Coupons Useful in Commercial and Security Transactions," filed on May 15, 2000, discusses a magnetic storage medium affixed to a card that can be read by a standard magnetic stripe reader. Here, a computer generates a personal coupon after a personal identification number is inputted into a card.

SUMMARY OF THE INVENTION

It is an object of the present invention to provide a dynamic credit card with a visible number that changes periodically (e.g., roughly every minute) or changes after each use. Thus, a dynamic credit card may include a battery, a processor or other circuitry, and a display. An encoder may also be provided such that the number is not only displayed to a user, but may be written onto the magnetic stripe of the credit card such that traditional readers may read the credit card. Alternatively, circuitry that creates magnetic fields that can be read by a traditional credit card reader may be employed such that a magnetic stripe may be removed altogether.

For dynamic credit cards that employ periodically changing numbers, a timing signal may be used. For example, a signal representative of time may be transmitted over an area (e.g., the United States). Such a timing signal may be the U.S. atomic clock signal (e.g., the WWVB signal), a European timing signal (e.g., the DCF and MSF signals), or a timing signal used in a locating/navigation system (e.g., a GPS signal).

A credit card may have a number that is secure to the user. This secure number may then be coded in a variety of ways. For example, the number may be coded dependent upon time. The coded number may be displayed to a user (and/or written to the magnetic stripe). A clock may be included in such a credit card to change the number every period of time. The clock may be synchronized with an external clock (e.g., the WWVB signal). Alternatively, the clock may be sufficient to keep track of time for a long period of time (e.g., 1-5 years) without accumulating errors that would be greater than the period of time used to change the credit card number (e.g., 1 minute). Thus, a clock may be utilized without external synchronization.

The coded number may then be transmitted (e.g., entered into the paying stage of an online store) to a credit card authorization facility. The credit card authorization facility may, in turn, know the user's secure number (e.g., the uncoded credit card number). To identify the user, the credit card authorization facility may utilize name information or account information transmitted with the coded number. The authorization facility may then decode the coded number to determine whether, for a particular period of time, the received coded number is representative of the uncoded number. The coded number may be, for example, representative of a credit card number, card verification number, expiration date, any combination thereof, or any additional information.

The authorization facility may determine if the coded number is valid for a particular period of time in a variety of ways. For example, the authorization facility may code the secure number in the same way as the dynamic credit card would have coded the number and compare the number computed by the facility to the number received by the facility. Alternatively, the credit card authorization facility may decode the coded number and compare the decoded number to the secure number.

A dynamic credit card that periodically changes the credit card number may occur at any interval. For example, the credit card number may be changed approximately every minute, every ninety seconds, every five minutes, or every hour.

Instead of receiving a transmitted timing signal (e.g., and employing a receiver), a local timing circuit may be provided (e.g., a counter driven by a clock/oscillator). Alternatively, the card may both receive a transmitted timing signal (e.g., an atomic clock signal) as well as employ a local timing circuit. In such an embodiment, the local timing circuit may be updated (e.g., resynchronized) periodically (e.g., every day) or continually by the received timing signal. Alternatively, the local timing circuit may be utilized when a global timing signal is not received (e.g., when a card configured only to use the U.S. Atomic Clock Signal travels to Europe for a week).

A dynamic credit card may also not include a display and the credit card number may be updated continually in real time.

As stated above, an encoder may be provided in a dynamic credit card. Such an encoder may be utilized to realize a number of useful functions. An encoder allows for information to be written on a magnetic stripe (or read by a magnetic stripe reader). Thus, a dynamic credit card may utilize free space on the magnetic stripe to write additional information. Such information may take many forms and generally may be referred to as dynamic feedback information. For example, software and/or circuitry may be included on the dynamic credit card to detect if a person has attempted to hack into the dynamic credit card. Thus, information may be transmitted to the credit card authorization facility representative of the status, or state, of the credit card (e.g., SECURE, INSECURE). As per another example, information as to the components of the credit card may be transmitted as feedback information. For example, if circuitry and/or software detects that a battery is a week from dying or is storing below a particular threshold of energy information can be transmitted with the next credit card purchase stating that a battery is weak. In turn, the authorization facility may utilize the weak battery information and send out a replacement card (or replacement battery) so that the user receives the replacement card (or battery) before the user's battery dies. The amount of energy stored in the one or more batteries may also be transmitted as feedback information.

Such dynamic feedback information may be displayed to the user via a display on the credit card (e.g., by displaying "weak battery" or "insecure"). Alternatively, the credit card authorization facility may publish dynamic information on a website associated to the user (or credit card). In this manner, a user may see "weak battery" on the display of the credit card and then log into a website to see additional information such as "weak battery, 9 days left" or "weak batter, 15 magnetic stripe writes left." As a result, a complete feedback loop is provided in credit cards. Additional information may be sent to a credit card authorization facility by writing to a magnetic stripe and information may be returned to the user via a display or website. If each dynamic credit card receives a signal, then information may be fed back to the dynamic credit card directly from the credit card authorization facility through this signal. Thus, for example, within a period of time (e.g., one minute) of making a purchase, the credit card may be notified that the purchase was approved and is completed and may, accordingly, notify the user that the purchase was approved. Such a notification can take many forms such as, for example, displaying text on the display screen or causing the credit card to vibrate.

Alternatively still, a dynamic credit card may be realized by utilizing a counter, random number generator, or pseudo-random number generator to provide a coded number. If a counter is provided, the counter may be incremented periodically (or when the credit card is used). The counter may be utilized in a coding function and this number may also be transmitted to a authorization facility when the dynamic credit card number is transmitted to the authorization facility.

When making an online credit card purchase, a security code (e.g., a credit card verification code such as a three or four digit credit card verification code) may also be submitted as part of a credit card authorization process. Such a security code may also be dynamic and may be utilized to transmit information on how to decode/verify that the dynamic credit card number is valid. For example, the dynamic security code may be the counter number itself. Thus, if the counter number is used to encode a secure credit card number by a formula, the counter is sent to the authorization facility which may, in turn, decode the dynamic credit card number by a formula using the counter number to obtain, and verify through comparison, the secure credit card number.

A dynamic security code may be provided on a display screen separate from the dynamic credit card number or the dynamic security code may be provided on the same display screen as the dynamic credit card number. Additionally, a dynamic credit card may be provided with a dynamic security code and a static credit card number such that only the dynamic security code changes. Such an embodiment may, or may not, include an encoder. Thus, a credit card may be provided that includes a dynamic security code for online purchases. The dynamic security code may change periodically (e.g., roughly every one minute, ninety seconds, two minutes, or a time in between these intervals such as one hundred seconds) and an online credit card authorization facility may check to make sure the dynamic security code is valid for a particular period of time (e.g., the period of time the dynamic security code was received or the period of time associated with a time stamp sent with the dynamic security code).

A number of embodiments may be fabricated that utilizes a counter. For example, if the counter is large enough (or the period that the counter is clocked at is slow enough) then the counter may take decades before the counter has reached its last number. Such a counter may take decades before a dynamic credit card has to be replaced or the dynamic credit card numbers repeat. A counter may reset after the counter has exceeded the maximum limit of the counter. Such a counter may be utilized as its own clock such that every time a particular counter number is reached (e.g., 111111), a dynamic number is changed (e.g., a new dynamic number is retrieved from a table of numbers, the next dynamic number is used, or the dynamic number is obtained by coding a number with a clock representative of the time or period of time). A dynamic credit card may include multiple clocks. For example, one clock may keep track of the period of time until a change occurs (e.g., a one-minute clock) while a larger clock keeps track of the time period that the smaller clock is counting down (e.g., a minute/hour/day/month/year time or another number representative of a particular period of time).

A random number generator may be utilized in lieu of a counter and this random number may be utilized as part of a coding function and transmitted to a authorization facility via a security code or additional dynamic information on the credit card. For example, a random number generator may be provided that appears random but that may always provide a particular number at a particular iteration. For example, when such a random number generator is first turned on, the first number outputted from the generator may always be the same. Thus, information about the generators iteration may be provided to a credit card authorization facility and the credit card authorization facility may use such iteration information to determine whether or not the received information is representative of a valid credit card number for that iteration. The iteration may be periodically changed by a clock.

A pseudo random number generator may be utilized such that noise data is inserted according to a function into a number (e.g., a number from the random number generator). This pseudorandom number (and possible decoding information) may be transmitted to a credit card authorization facility such that the noise data is removed and the random number is obtained. The random number may then be utilized to decode the dynamic credit card number (or dynamic security code) to the secure credit card number (or the secure security code).

The encoder may take numerous forms. For example, the encoder may take the form of an array of conductive wires. The array may be aligned with a magnetic stripe. Positive and negative voltages may be applied to the array such that a particular number is written to the magnetic stripe. Accordingly, reversing the current through the wires may change the polarities of the magnetic fields created by the wires. Thus, such an array of conductive wires may be able to flip, or define, the North-South magnetic domains (and flux reversals) found on the magnetic stripe. The wires may be formed into a ring (e.g., a solenoid) that has a gap such that a North-South field (or a South-North field) is created in the gap. One or more such rings may be utilized to write to any data point on the magnetic stripe. Thus, the rings, or wires, may conduct current one at a time (e.g., left-to-write) to write to a magnetic stripe without moving the magnetic stripe or the solenoid.

As a traditional reader reads flux reversals (e.g., "North-North" and "South-South" interfaces) by reading either a plus or negative voltage, flux reversals may be created by an array of wires that induce positive and negative voltages in the reader such that the need for a magnetic stripe is removed entirely.

In addition to storing credit card numbers and expiration dates on a magnetic strip, an account identification number, or the name of the user, may also be stored on a magnetic strip. As such, the user of the account can be determined such that the dynamic credit card number may be verified.

Alternatively, only the security code (e.g., only the credit card verification code) may be dynamic such that the credit card number is utilized to determine the user. Thus, a dynamic security code may be formed by applying a time or counter signal to a formula with a secure security code, the dynamic security code may be sent, and the dynamic security may be decoded and compared to a copy of the secure code at the authorization facility for verification.

A dynamic credit card may also be provided with a number of different coding schemes (or secure numbers to utilize in a coding scheme to produce a dynamic coded number). As such, a bank may store the information about each scheme (or secure number) in different locations such that if one location is compromised (e.g., the secure number data is stolen from a facility) the dynamic credit card can switch to a different scheme (or secure number) without threat of fraudulent use. Such a scheme may be controlled by a user through a manual switch. Alternatively, a credit card may receive signals indicative of a switch in schemes and the credit card may, accordingly, switch to a particular scheme. The type of scheme (which may just be a switch in the secure number that is coded) may be provided on a display of the dynamic credit card to verify that a particular scheme is being utilized (e.g., so a user can know if the card has manually configured to scheme two after the user hears news reports that all Bank of America Cards need to be changed to scheme 2). Accordingly, a credit card authorization facility may check to see if another scheme is being utilized and may return information to the card reader (or a device coupled to the card reader) instructing the administrator of the card reader to tell the user to change schemes (or for the administrator to change schemes himself/herself).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 6 is an illustration of a dynamic credit card constructed in accordance with the principles of the present invention;

DETAILED DESCRIPTION OF THE INVENTION

Figure 1:
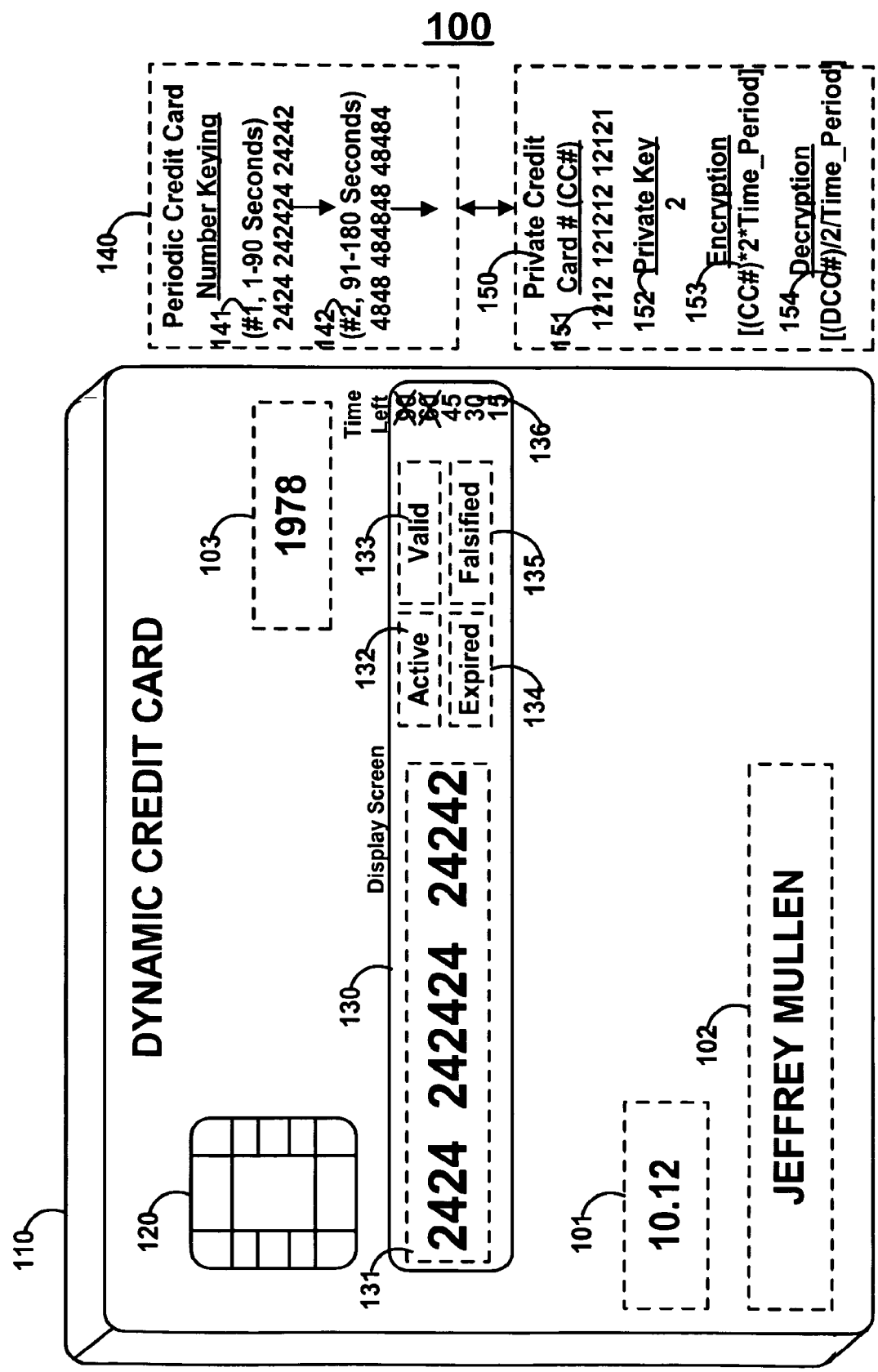
FIG. 1 is an illustration of a dynamic credit card constructed in accordance with the principles of the present invention.

FIG. 1 shows dynamic credit card 100 that may include, for example, display 130, processing circuitry, memory, a receiver, and one or more batteries (or other source of power). Credit card 100 also may include smart chip 120 (or other circuitry), security number 103 (e.g., credit card verification code), expiration date 101, and cardholder name 102. Persons skilled in the art will appreciate that writings on a surface of the credit card may be printed and/or pressed into a housing. For example the name of the user may be pressed into the interior side of the front of a dynamic credit card so that the name extends out from the front surface of the credit card.

Display 130 may be utilized to, for example, display dynamic credit card number 131, a dynamic security number such as a verification code (e.g., number 103), the status of the card (e.g., statuses 132-135), and/or the time left before dynamic credit card number 131 changes via timing information 136. Timing information 136 (or additional timing information) may be provide to display the time left before a dynamic security number, or any other type of information, changes. Display screen 130 may extend from, or may be aligned with, the surface of the front of dynamic credit card 100.

Dynamic credit card 100 may be provided such that the credit card number on display 130 changes periodically. As shown in timing chart 140, the credit card number may be "2424 242424 24242" during the one period of operation (e.g., period 141 such as the first ninety seconds) and then change to "4848 484848 48484" during the next period of operation (e.g., period 142 such as the second ninety seconds). In this manner, the credit card number changes such that the credit card number is dynamic. As a result, the credit card number may generally not be copied down and utilized again in the future. A processing facility is providing with information such that the processing facility can validate a dynamic number (e.g., a dynamic credit card number or a dynamic security code such as a credit card verification code). Thus, a user can purchase items using a dynamic credit card and a processing facility can authorize such purchases by recognizing that a dynamic number is valid (e.g., valid for a particular period of time).

Realizing a dynamic credit card number (or any dynamic number), and the functionality needed to verify the dynamic credit card number (or any dynamic number) at a processing/authorization facility, may be accomplished in a variety of ways.

For example, a private key (or equation) and a secure credit card number (e.g., a private number) may be known to both the dynamic credit card (e.g., stored in the memory of a dynamic credit card) and the processing/authorization facility. In this manner, a timing signal may be received by the dynamic credit card (e.g., from a GPS satellite or another timing signal such as a clock located in the dynamic credit card) and the dynamic credit card may produce a dynamic credit card number based on the received time (e.g., a particular period of time), the private key (or equation) and the private credit card number. The processing facility may also have a clock and may utilize the private key, private credit card number, the dynamic number, and the time (e.g., a particular period of time) to verify that the dynamic number is correct for that period of time (or a string of consecutive periods of time).

The processing facility may, for example, receive a time stamp with the dynamic number and any other information received from a dynamic credit card (e.g., account identification information and expiration date). The processing facility may use the time stamp, the received dynamic credit card information (and any other received information), the private key, and the private number to verify that the dynamic number is correct for that period of time (or a string of consecutive periods of time that include, and are located near, the time stamp). As such, online purchases that are not immediately processed, or that have a particular delay (e.g., 30 minutes), may still be processed. A time stamp may also be utilized, for example, in situations where a credit card number is taken over the phone and is not immediately processed (e.g., the buyer requests additional information before confirming a purchase). A time stamp may be indicative of, for example, a particular time or period of time.

To obtain periodic functionality, year, month, day, and minute information may be utilized as well as leap year and daylight savings time data. Persons skilled in the art will appreciate that while a dynamic credit card may receive a large amount of timing information (e.g., year, month, day, hour, minute, and second information), a dynamic credit card may only utilize a portion of this data (e.g., the minute information) and may discard the rest of the data. By only utilizing the minute information, for example, the dynamic credit card may provide a dynamic credit card number (or, for example, a dynamic security code) that changes approximately every minute.

Similarly, not utilizing the minute information, but using hour information may provide a dynamic number that changes approximately every hour. The speed at which the dynamic number changes may be changed at any time during operation for any reason. For example, if the dynamic credit card detects tampering, the dynamic credit card may decrease the period (e.g., speed up changing of the dynamic numbers). Thus, a dynamic credit card that has a limited amount of credit card numbers (e.g., retrieves a number from a stored table of numbers) may quickly exhaust a pool of available numbers. If the rate of change is increased beyond the refresh rate of the display, then the numbers may not be able to be displayed. Alternatively, if the rate of change is increased beyond the rate that a user can discern the numbers, then a user may not be able to visibly see the numbers. Speeding up the rate at which a dynamic number changes, however, may also make it impossible for a user to enter a number online (e.g., enter a dynamic security code). Moreover, changing the rate of the dynamic number may cause the dynamic number to become out of synchronization with the processing facility. Thus, although dynamic numbers may be produced, the dynamic numbers may not be able to be validated by the processing facility. Thus, changing the rate at which a dynamic number changes may render a dynamic credit card useless. As such, a dynamic credit card may also increase the period of change (e.g., slow down the change) such that future dynamic numbers cannot be validated because such future dynamic numbers may be out of synch with a processing facility.

Persons skilled in the art will appreciate that a dynamic credit card number may be produced without the need for a private number such as a private credit card number or security code (e.g., a number stored in both the credit card and a remote facility). For example, the timing signal may just be encoded based on the private key (or equation) and the resultant encoded number utilized as a dynamic credit card number. Alternatively, the timing signal may be coded using the private credit card number.

Persons skilled in the art will appreciate that a private key may be an equation or formula that uses one or more other variables (e.g., a private credit card number and/or a timing signal such as a particular time or period of time) to generate a coded number (e.g., a dynamic credit card number). Persons skilled in the art will appreciate that one or more private keys (e.g., an equation or formula) may be utilized to code different numbers for a dynamic credit card. For example, one private key may be utilized to code a dynamic credit card number while another private key may be utilized to code a dynamic security code (e.g., a verification code).

Additionally, a number of private keys (and/or private numbers) may be stored in a credit card and such private keys (and/or private numbers) may be changed periodically (e.g., every day or week). A similar number of private keys (and/or private numbers) may be stored in a remote facility (e.g., a remote server), the selection of which may be determined by a particular time (e.g., a particular day or a particular week).

At the processing/authorization facility, or at any remote device, the dynamic credit card number may be received and either decoded based on a replica of the private key and/or private number of the credit card that is stored at, or accessible by, the facility (e.g., stored on a database or server).

If company can process a credit card number faster than the period of change, no timing information may, for example, be transmitted to a processing/authorization facility as the processing/authorization facility may be substantially in synchronization the company. Persons skilled in the art will appreciate that internal clocks (or clock/oscillator driven counters) may accumulate errors. Persons skilled in the art will also appreciate that delays may occur if a timing signal is transmitted wirelessly to a dynamic credit card. As such, the period of change may be set such to take into account processing delays (e.g., the amount of time it takes to authorize a card) as well as internal errors for a period of time (e.g., clock errors) and/or transmission delays.

Persons skilled in the art will appreciate that a processing facility may authorize dynamic numbers that are valid for a particular number of periods before, or after, the period being utilized by the remote facility. Such a process may be initiated, for example, if the received dynamic number cannot be validated. The processing facility may, if a dynamic number is recognized for another period of time within a defined amount of time from the period of time being utilized by the processing facility, keep track of nearby valid dynamic numbers and, so long as the process is not abused or the error is maintained, validate such numbers. As such, the processing facility may, for example, detect timing errors in the dynamic number and either validate future dynamic numbers with the same (or a similar error) or readjust the timing signal utilized by the remote facility (e.g., introduce errors into the facilities timing generator such as reducing a counter by a particular amount of time or resetting a counter). Persons skilled in the art will also appreciate that no timing signals may be utilized. For example, a credit card may, at the push of a button on the dynamic credit card, generate a new number (e.g., from a list of stored numbers). A remote facility may determine if the button was pressed on the dynamic credit card by determining if a future dynamic number is valid and, if a future number is valid, the remote facility may invalidate all numbers located before the newly validated number. At the next transaction, the dynamic facility may, for example, attempt to validate the received number with the number located after the newly validated number. A tables may store, for example, a dynamic number and a pointer to the next entry. Thus, a processor may read a dynamic number and utilize the pointer to determine the location of the next dynamic number.

A remote processing/authorization facility may, for example, perform the same process as the dynamic credit card and compare the facility's dynamic number with the received dynamic number for verification. For example, a remote facility may include any equations and variables needed by the dynamic credit card to generate a dynamic number and may perform an operation similar to the one performed by the dynamic credit card to generate its own dynamic number. The remote facility may then compare the received dynamic number to the generated dynamic number to see if the two numbers are the same.

A remote processing/authorization facility may decode a dynamic number using an equation and/or a private key (which may be an equation itself or a variable) to obtain a resultant number and compare this number against a private number for approval. If the decoded number matches the private number (which may, or may not, be the same private number stored in the credit card), then the dynamic number may be validated.

Thus, a dynamic credit card may be utilized using traditional infrastructure and may be utilized for online (or telephonic) purchases and purchases that require the card to be swiped (or entered manually into a credit card reader). Persons skilled in the art will appreciate that the dynamic number may be decoded at any point in a validation/authorization process. For example, an online store may include the components (e.g., software) necessary to decode the dynamic number such that a decoded number (e.g., a credit card number) may be transmitted to a credit card processing facility.

Persons skilled in the art will appreciate that a processing facility, or any device decoding a number, may utilize an identification number to identify the account/card that produced the dynamic number. The identification number may then be utilized to look up, for example, the private key and/or private number of the account/card such that a dynamic number can be generated from the retrieved information (and compared to the received dynamic number) or the retrieved information can be utilized to decode the dynamic number such that the card may be validated. Thus, multiple users may be utilizing the same dynamic number at any one time and the identify of the account/card can still be determined (e.g., by using the identification information).

Identification information is utilized to identify a credit card. As such, multiple users may be utilizing the same dynamic number (e.g., a dynamic credit card number or a dynamic verification code) at any time. Generally, the identification information is simply utilized to identify a credit card such that a dynamic number can be, for example, retrieved/generated for a particular period of time for the identified credit card and compared to the received dynamic number.

Persons skilled in the art will appreciate that one-click shopping may still be realized by storing the time information when the credit card number was stored on a website (e.g., providing a time stamp). This timing information may be sent to the credit card processing facility such that the credit card processing facility may authorize payment by determining if the number was valid for the time period representative of the timing information that was received. The transmission of timing information may also be utilized if, for example, a credit card company takes a relatively long time to process purchases.

The dynamic credit card number may always be transformed into a particular credit card format so that the number can be verified as having the appropriate format before, for example, the number is transmitted to a credit card processing/authorization facility. For example, a coding equation may be utilized that always produces numbers that fit a particular format.

Persons skilled in the art will appreciate that a dynamic credit card system may allow multiple users to have the same dynamic number at any particular time. As a result, additional information may be transmitted to identify the user. For example, an account number and/or name may be utilized. Alternatively, for example, a traditional credit card number may be written on a traditional magnetic stripe. Such a credit card number may be used for identifying the user. A dynamic security code (e.g., a four digit security code such as a verification code) may then be provided that changes periodically. Such dynamic information (e.g., the dynamic security code) could be written to a portion of the magnetic stripe that does not have the traditional credit card number or the dynamic information (e.g., the dynamic security code) may be displayed to a user.

Persons skilled in the art will appreciate that no timing signal is needed. Instead a counter (or random number generator that operates similar to a random number generator in a processing facility) may be utilized to produce a key that is used in an equation to manipulate a credit card number. Such a counter number (or random number) may be provided to a processing facility so that the processing facility may decode (or perform the same function as the dynamic credit card and compare the results). In such an embodiment, such a credit card number may be invalidated at the facility if, for example, any particular number is used more than a particular number of times (e.g., more than 10 times). Such a counter may be increased after every purchase (e.g., after a user presses a button to change the number). As per another example, if a counter is used and the counter is increased when a number is used (or the credit card believes that a number has been used), the number of transactions operable of being made may be limited by the storage capacity of the counter.

Portion 150 shows an example of a dynamic number, particularly a dynamic credit card number, that is dependent on time. Here, the private number is "1212 121212 12121" and the private key is "2." Thus, one encryption algorithm may be the private number multiplied by the private key multiplied by the timing information. If the answer is larger than the number of digits utilized to represent a dynamic number than the number may be scaled down using a MOD operation or by simple cutting off either the appropriate number of starting or end bits (or a combination of both). The processing/authorization side may then perform the same operation as the dynamic credit card and compare the results or may decode the received information and compare the result of the decoding against a stored value (e.g., a private key or a private credit card number). For example, decryption 154 may divide the dynamic credit card number by 2 and then divide this by the time and compare the result to the private credit card number. Persons skilled in the art will appreciate that the private key may be the encryption algorithm itself (e.g., multiply the private number by the time period, or time, and two).

Timing information may be utilized to select a private key, private number, and/or encryption algorithm that is utilized for that particular amount of time. As such, for example, timing information is not directly needed in an encryption algorithm to encrypt a number and provide a dynamic number. Persons skilled in the art will appreciate that a private number is not needed and that, for example, timing information may be encrypted with a private key to generate a dynamic number).

Status information 132-135 may also be provided on a dynamic credit card. Such status information may include, for example, active status 132 indicative of whether the card is still producing valid numbers. Status information may include expired 134 that may be indicative of whether the card has expired. Status information may include valid status 133 indicative of whether the card has not been tampered with. Status information may include falsified status 135 that may be indicative of whether the card has been tampered with. Additional status information may include, for example, an exhausted status that may be indicative of the card exhausting all valid credit card numbers (e.g., the table of credit card numbers has been used). Timing status 136 may be utilized and may be indicative of, for example, when the dynamic number is expected to change. Alternatively, the display of a dynamic number may change when the dynamic number is about to change. For example, a number may dim as the time the number has been active increases (e.g., the amount of time before a change decreases). The number may begin to dim at a particular time (e.g., halfway through a period). The number may then disappear and not be displayed at an interval of time right before the change (e.g., during the last five seconds before a change) Thus, the dynamic number itself may be modified to be indicative of an upcoming dynamic number change. Timing information may include a number that counts down (e.g., a number representative of the seconds left before the number changes).

Additional status information may include for example, the amount of dynamic numbers that have been generated or the amount of time the credit card has been active for. Additional status information may also include, for example, the current date and time such that a user making a purchase to a person over the telephone knows the time and day from the perspective of the credit card (e.g., so that the telephone operator may generate a time stamp for the dynamic number).

Figure 2:
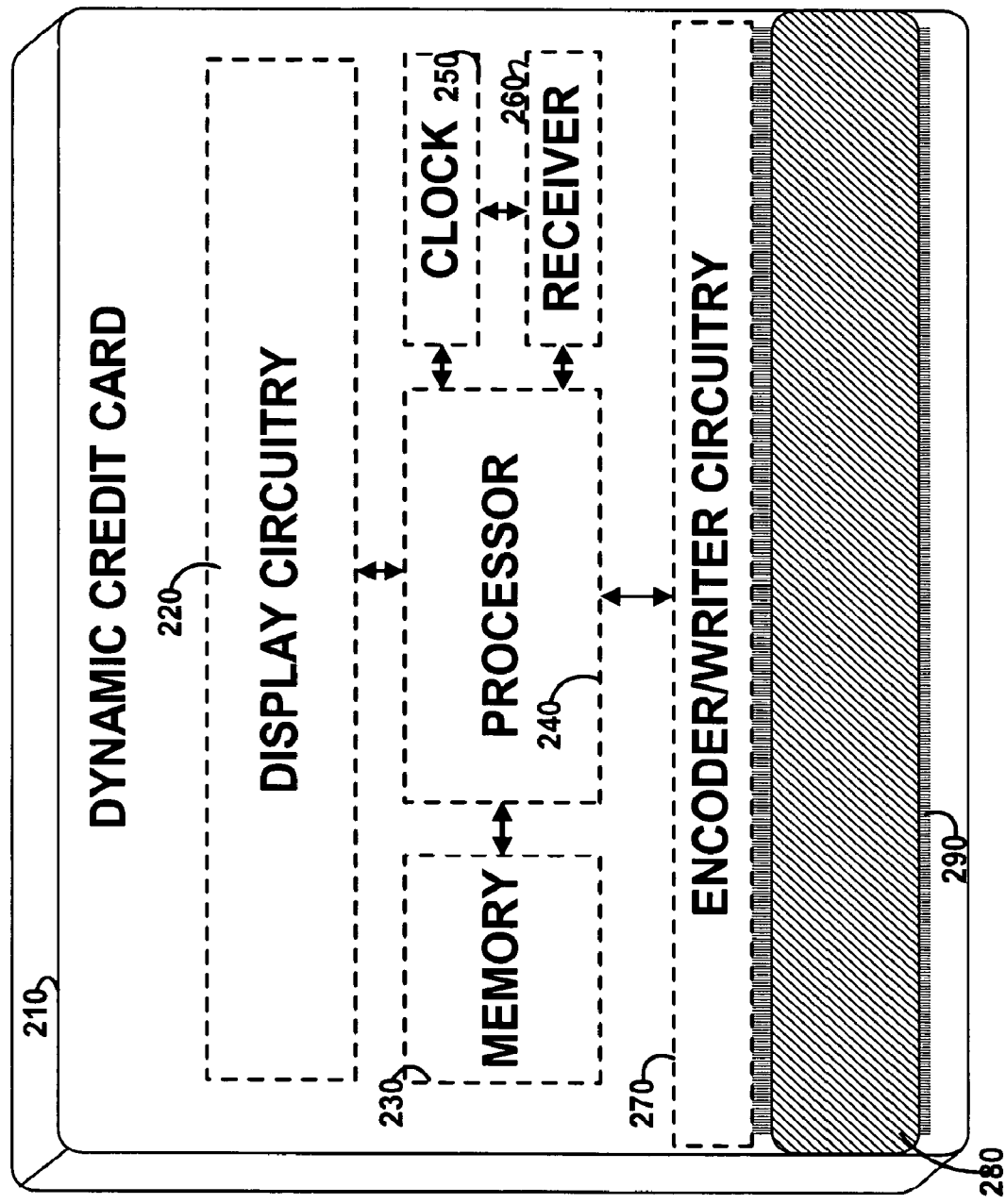
FIG. 2 is an illustration of a dynamic credit card constructed in accordance with the principles of the present invention.

FIG. 2 shows dynamic credit card 200 that may include display circuitry 220 (and a display), memory 230, processor 240, clock 250, receiver 260, encoder/writer circuitry 270 and 290, and magnetic stripe 280, one or more additional clocks/counters, and one or more batteries.

Persons skilled in the art will appreciate that for credit card readers operable to read from a smart chip (e.g., read a smart card), information may be transmitted to the reader via the smart chip (e.g., via the smart card). Such information may include, for example, a dynamic credit card number, a dynamic security code such as a verification code, identification information (e.g., a user/account/card identification number/name), and an expiration date. In such an example, the smart chip may also be utilized as processing circuitry (e.g., as processor 240).

Persons skilled in the art will appreciate that if the period of a dynamic credit card number is long enough, one or more local clocks may be all that is needed. For example, clocking circuitry may take decades before such circuitry is OFF by more than a minute. Thus, a dynamic credit card may utilize clocking circuitry if the period of change is a minute or more for decades without providing an incorrect dynamic number and the reception of a timing signal would not be necessary. Alternatively, for systems in which the dynamic credit card number is updated at a quick pace, an internal clock may also be beneficial as some clock signals take a minute or more to be transmitted. Thus, the timing signal that is received via a receiver may be utilized to reset, or correct any errors in, one or more internal clocks.

A clock operable of measuring a period of time may be fabricated from, for example, a counter and an oscillator. The counter may have a maximum capacity associated to the particular period of time and may overflow back to zero (e.g., reset) after counter has been increased past the maximum capacity of the counter. A second counter may be provided that may be incremented every time the counter overflows (or hits a particular number). Such a second counter may have a large capacity and the second counter may be utilized to generate a dynamic number. The second counter may be used as, for example, a key in a coding equation. Alternatively, the second counter may be utilized to generate a number from a random number generator (e.g., to determine the iteration of the random number generator).

Figure 3:
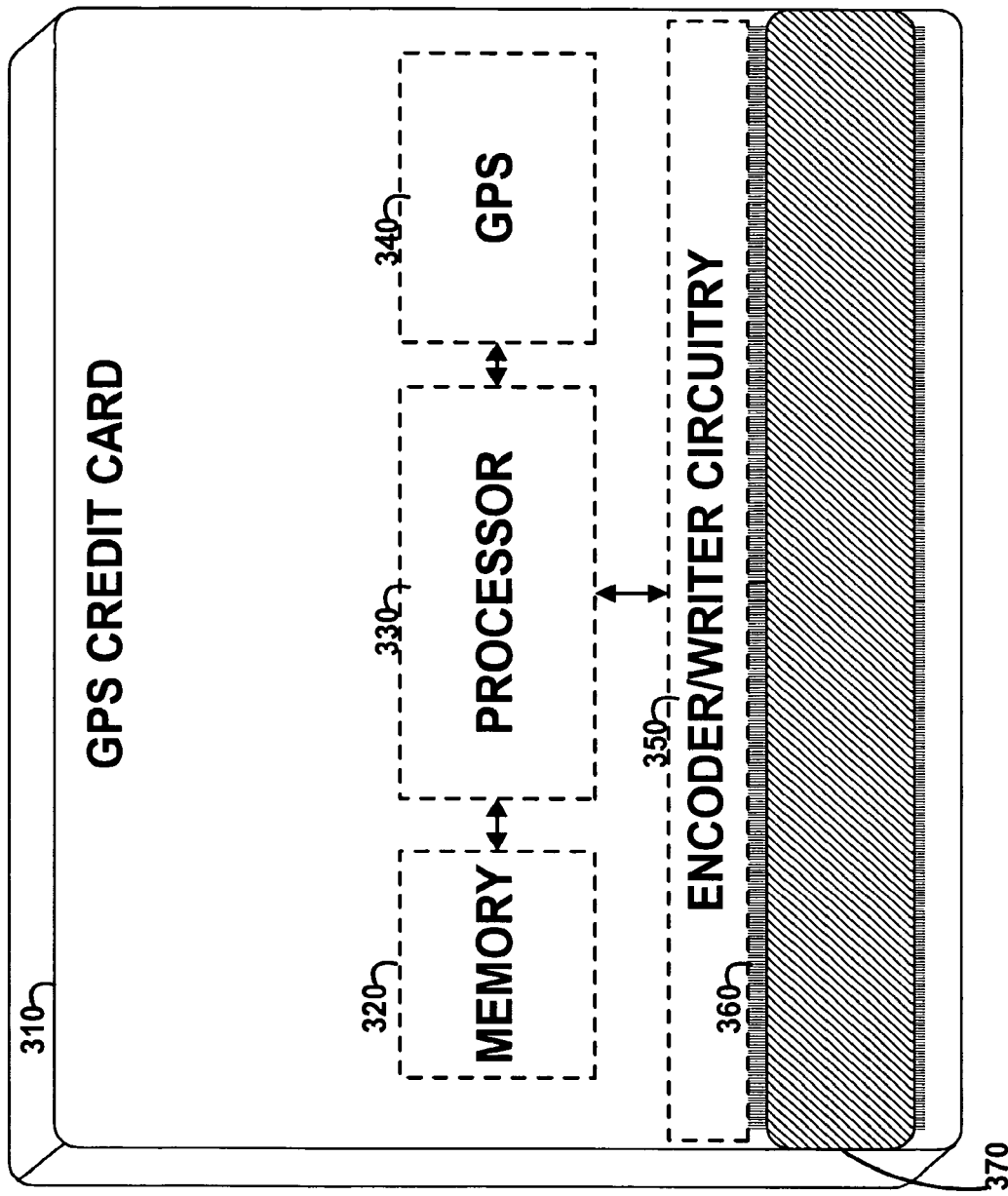
FIG. 3 is an illustration of a dynamic credit card constructed in accordance with the principles of the present invention.

FIG. 3 shows credit card 300 that may include any type of components such as, for example, the components of credit card 200. Credit card 300 may include, for example, a magnetic stripe (which may include numerous information tracks such as three information tracks), encoder circuitry 350 and 360, processor 330, memory 320, and a location receiver 340 (e.g., a GPS or Galileo receiver).

A location signal receiver may utilize received location signals as timing signals if, for example, timing signals can be derived from the location signals. Alternatively, the ability to locate a credit card may be utilized advantageously in a traditional credit card. For example, the inclusion of a locating feature may assist in locating a lost, or stolen, card. Location information may also be utilized to provide a dynamic number (e.g., a dynamic credit card number) and location information may be transmitted to a processing/authorization facility, or any facility or computer, in order to decode, or encode and compare, a dynamic number that has been generated on location information. Location information may be written to a magnetic stripe such that a processing facility receives information representative of location information.

Location information, or any information, may also be embedded into a dynamic number such that feedback can occur when a card is used online. For example, a dynamic credit card may generate a dynamic number and then add a number representative of additional information (e.g., a location) to the dynamic number in order to embed the additional information with the dynamic number. The processing facility may then also generate a dynamic number (using private and timing information) and determine the embedded number by determining the amount that was added to the dynamic number. Thus, additional information may be fed back to a processing facility even when the card is utilized online. As such, a card may be stolen and may generate a number in Maryland, but may be used to buy an item on an online store by an accomplice located in Florida. By embedding location information, a processing/authorization facility (which may be the online store) may determine that the number was generated in Maryland (by retrieving the embedded location information) and may alert the Maryland authorities or decline the transaction because the IP address of the purchasing computer was located in Florida (not Maryland). If fraudulent use is detected, a system may put a HOLD on the account such that the account cannot be used (e.g., until the owner verifies possession of the dynamic credit card).

Figure 4:
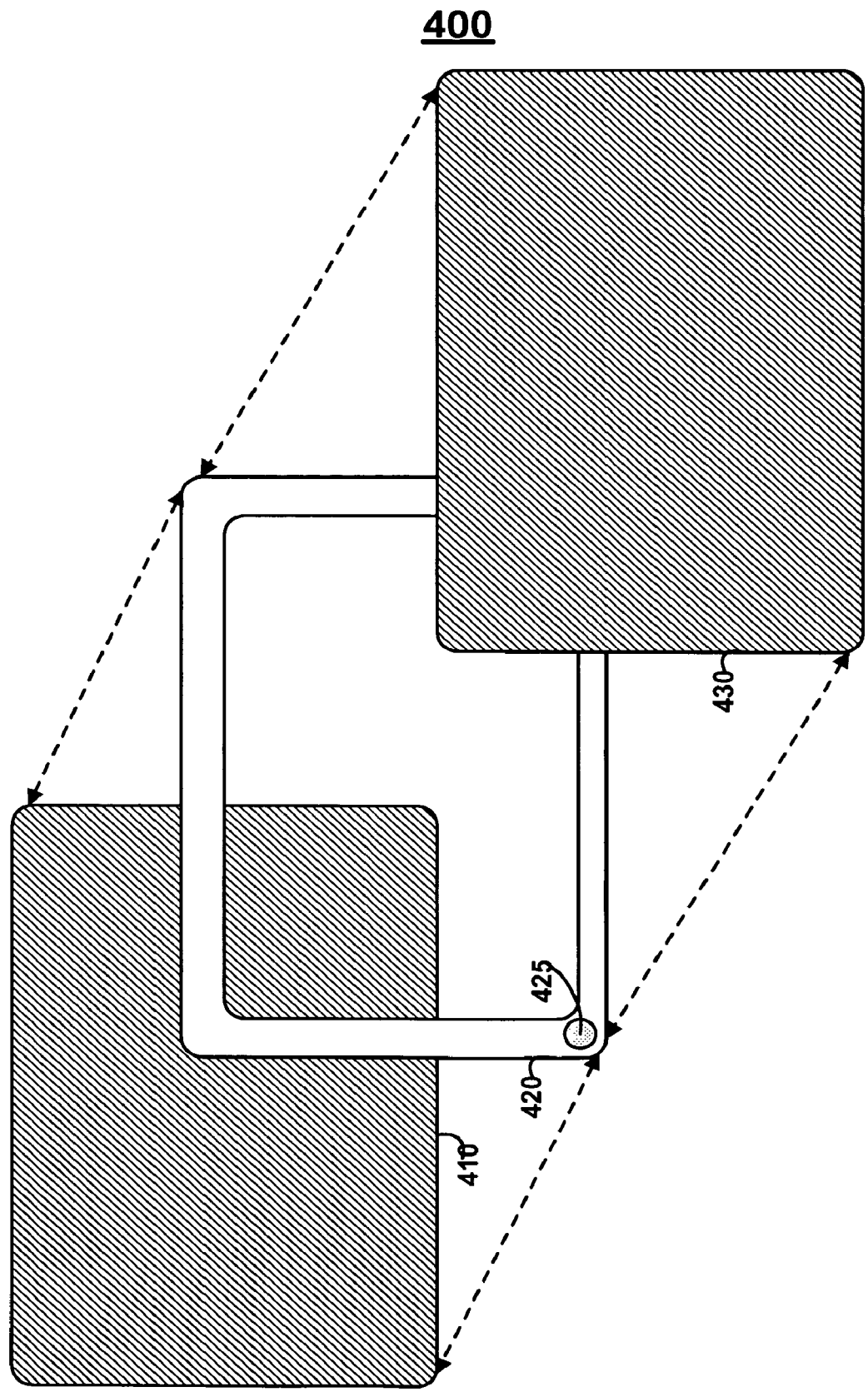
FIG. 4 is an illustration of a dynamic credit card constructed in accordance with the principles of the present invention.

FIG. 4 shows dynamic credit card housing comprising layers 410, 420, and 430 coupled together via glue 425. A portion of layer 425 may be cut out such that space is provided in which circuitry may be stored. Similarly, layer 410 may include a cavity that may house dynamic credit card circuitry (e.g., a portion of dynamic credit card circuitry). Additional layers may be provided with cutouts for circuitry. For example, a display may be taller than layer 420 although all other circuitry may not be taller than layer 420. As such one or more additional layers may be included with a cutout just for a display. Such additional layers may increase the structural integrity of a dynamic credit card. Layers that provide a top or rear surface of a dynamic credit card (e.g., layers 420 and 430) may include, for example, cutouts for input/output devices. For example, layer 420 may include a cutout for a display while layer 410 may include a cutout for a magnetic stripe encoder. Cutouts may also be formed along the edges of any layer such that components may reside in such cutouts and may extend out of a housing (e.g., for a manual switch that switches between coding schemes).

Figure 5:
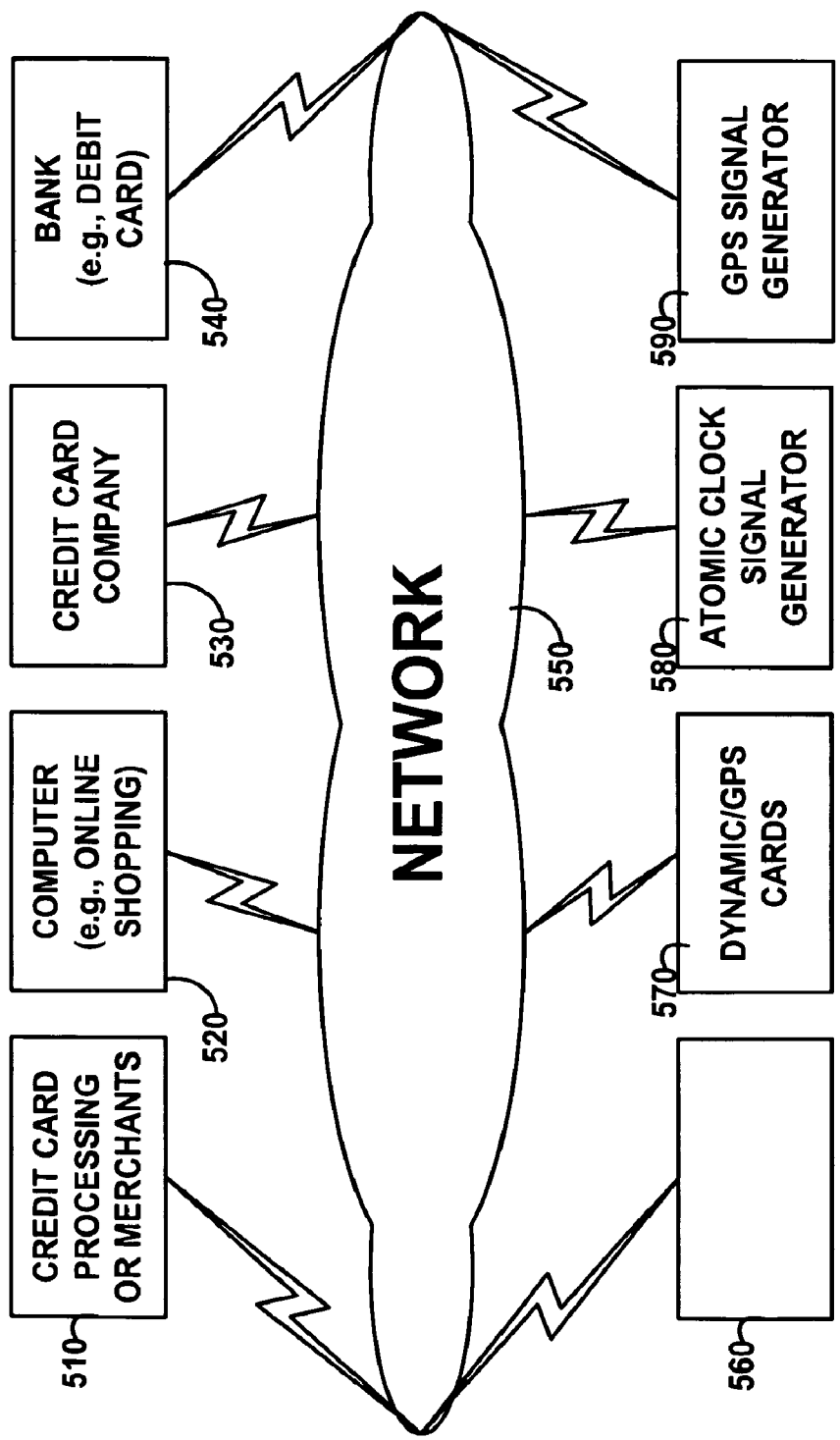
FIG. 5 is an illustration of a dynamic credit card network topology constructed in accordance with the principles of the present invention.

FIG. 5 shows network topology 500 that may include network 550 that may communicate with, and route information to/from, credit card processing facilities or merchants 510, computers 520, credit card companies 530, banks 540, dynamic and/or location cards 570, atomic clock signal transmitters 580, location information transmitters 590, or any other components, devices, or structures 560 (e.g., a remote server).

FIG. 6 shows dynamic credit card 600 that may include housing comprised of layer 610, layer 620, layer 630, and magnetic stripe 611. Credit card 640 may include circuitry 650 (e.g., memory, power source, timing circuitry, processor, and an encoder) and magnetic stripe 671. A protective layer 661 may be provided on protective housing 660 such that the magnetic stripe is protected from wear when protective layer 660 is attached to credit card 640 (e.g., via 672 and 662 mechanical connections). Persons skilled in the art will appreciate that encoder circuitry may be included not only in credit card 640 for writing to magnetic stripe 671 but also layer 660. In doing so, electromagnetic fields, or other signals that can write to a magnetic stripe, may be provided by layer 660 (e.g., so that one or both sides of magnetic stripe 671 may receive electromagnetic fields or other signals such that a write operation may occur). Layers 620 and 630 may not be long, or wide, as layer 610. Layer 610 may include an encoder and/or magnetic stripe such that the encoder and/or magnetic stripe are not covered by layers 620 and 630.

Figure 7:
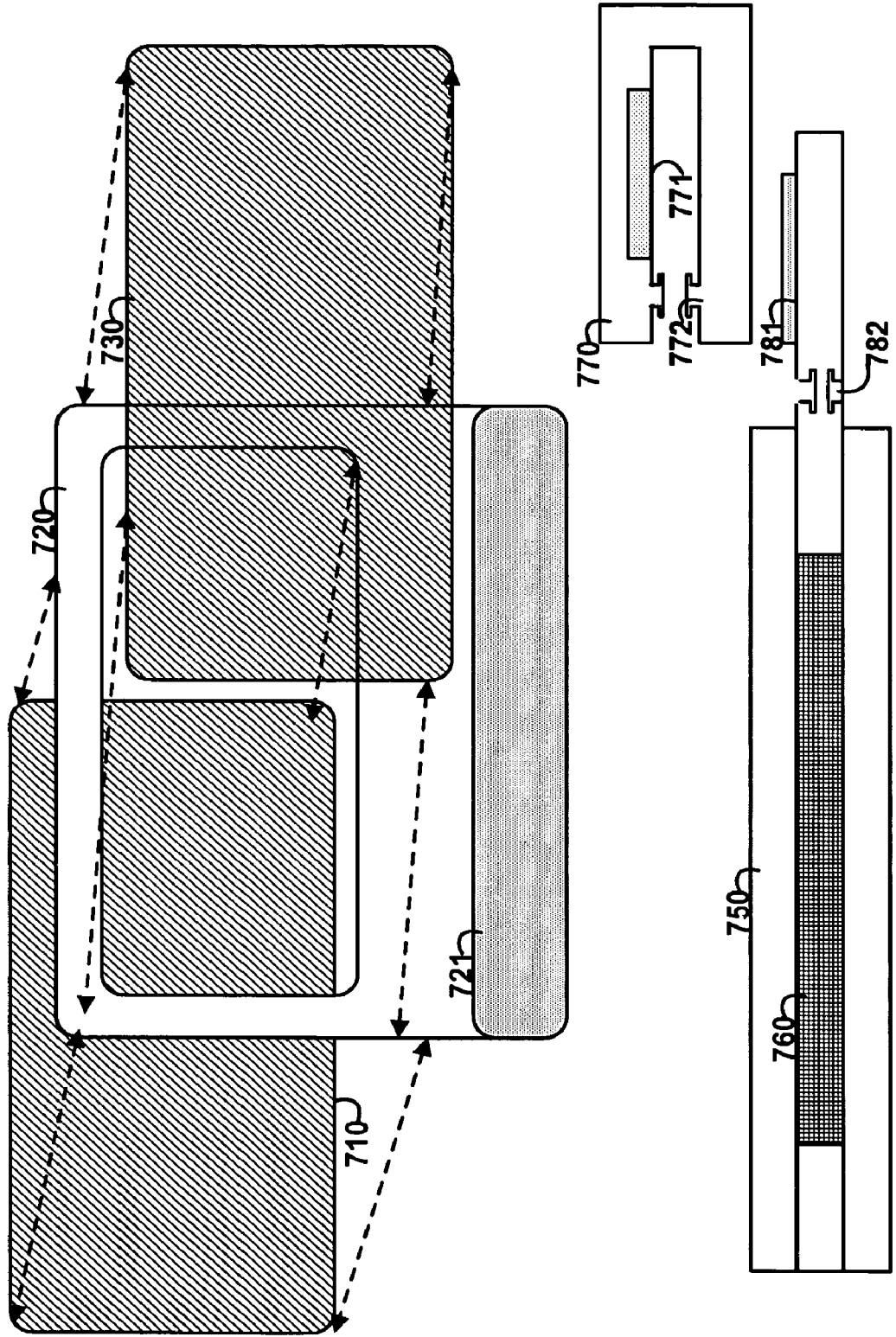
FIG. 7 is an illustration of a dynamic credit card constructed in accordance with the principles of the present invention.

FIG. 7 shows dynamic credit card 700 that includes housing fabricated from layers 710, 720, 730, and magnetic stripe 721 to form housing 750 that may store circuitry 750. Layer 770 may attach to, and be removed from, housing 750. Layer 770 may surround both sides of magnetic stripe 781 and may include the magnetic stripe encoder (which may, in turn, interface with circuitry 750 when attached such as interface through electrical connections located in mechanical connections 772). Layer 770 may have its own a source of power (e.g., a batter) such that layer 770 may be replaced when such a source of power dies instead of the entire credit card as persons skilled in the art will appreciate that the encoder may require the most amount of power out of all of the components of a dynamic credit card. Layer 770 may also receive power from a battery in housing 650 through electrical connections located in mechanical connection 772.

Persons skilled in the art will appreciate that the capability to write to a magnetic strip on a credit card "on the go" may realize a number of advantageous features. For example, information may be fed back to a processing/authorization facility by writing such information to the magnetic strip. Such information may include, for example, purchased product information, credit card status information, battery information, or any other type of information. Similar information may be included in a dynamic number such as an embedded dynamic number such that the information may be fed back when online purchases are made. Such information may also be included, for example, in a dynamic number by utilizing an expiration date as a dynamic number (or by utilizing an account holder name as a dynamic number) such that the information may be fed back when online purchases are made.

Tamper-proof software and hardware may be provided on a dynamic credit card. For example, software may be included to detect tampering of a clock if a thief attempts to speed up an internal clock (e.g., by speeding up an oscillator) or by transmitting a fake clock signal to a card. For example, additional clocks may be utilized and driven by different oscillators in order to determine whether or not a particular clock is being sped up or if a timing signal is being received at an inappropriate time. Similarly, information about previously transmitted/received information may be stored on the dynamic credit card such that the dynamic credit card can determine if a received signal (e.g., a received timing signal) does not reside in a predicted interval. Such software may then write to the encoder and transmit such information to the credit card facility or may be embedded in a dynamic number or transmitted inside of a dynamic number (e.g., transmitted as a dynamic expiration date). Such information may be parsed in the credit card information (or encoded with the credit card information) such that no one single portion of a magnetic strip contains such additional information.

Tamper-proof hardware may also be provided. More particularly, a wire may be glued to both sides of a housing such that if the housing is removed, the wire is cut. Current may be flowed through the wire and sensed such that if the wire is cut, the current will not flow and information that the housing has been opened may be transmitted to the processing facility. The operation of such a card, however, may not change such that the credit card may still produce dynamic numbers. Information, however, may be fed back to an authorization facility through the magnetic stripe of a card that that is indicative of a card having been opened. Thus, the authorization facility may, for example, alert authorities (e.g., a police station in the vicinity of the credit card purchase or the administrator of a credit card reader), but still process/authenticate the received number. As such, a user may still use the card until the user is caught. Alternatively, the processing facility may receive data indicative of a card having been opened (or otherwise tampered with) and may not authorize the purchase. Persons skilled in the art will appreciate that a wire does not have to be cut in order to produce a signal that the card has been opened. For example, a hall-effect sensor may be placed on a circuit and a magnet may be aligned with the magnet such that the sensor determines when the magnet is not in the presence of the sensor.

A dynamic credit card may allow for less digits to be utilized to represent a credit card number as a result of the increased security. Thus, such additional information may be encoded (or parsed into) the dynamic credit card number such that the information is also transmitted when orders are placed online.

Figure 8:
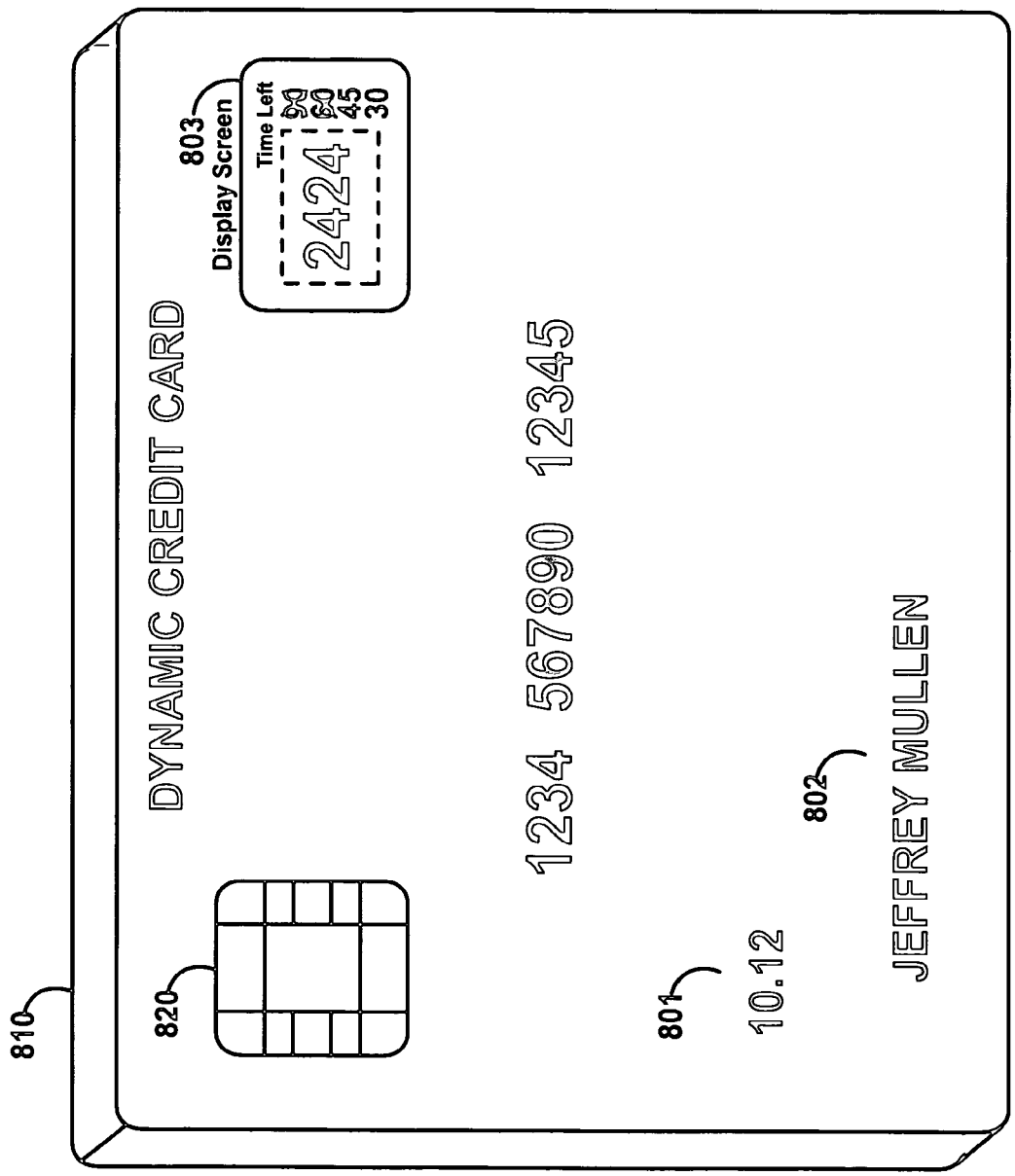
FIG. 8 is an illustration of a dynamic credit card with a dynamic security code constructed in accordance with the principles of the present invention.

FIG. 8 shows dynamic credit card 800 that may include display screen 803 for displaying a security code (e.g., a credit card verification number). The credit card number may be printed and/or pressed into card 810. A smart card chip may be provided as chip 820. The expiration date may be printed and/or pressed into card 810 as well as, for example, account holder name 802. The security code may be changed periodically (e.g., approximately every minute, ninety seconds, two minutes, or a time located therebetween). The dynamic security code (e.g., a credit card verification code) may be manipulated when the number is about to change (e.g., the number may be dimmed) or additional information may be provided representative of the time that is left before a change and/or battery power of the device. A magnetic stripe encoder may be provided (e.g., to feed back information or to transmit the dynamic credit card number) or a magnetic stripe encoder may not be provided (e.g., just a magnetic stripe is provided). The dynamic number may change as a result of information stored in a counter that may, for example, be driven by an oscillator. The display for the security code may be located off-center and near a corner of the front of the dynamic credit card.

Figure 9:
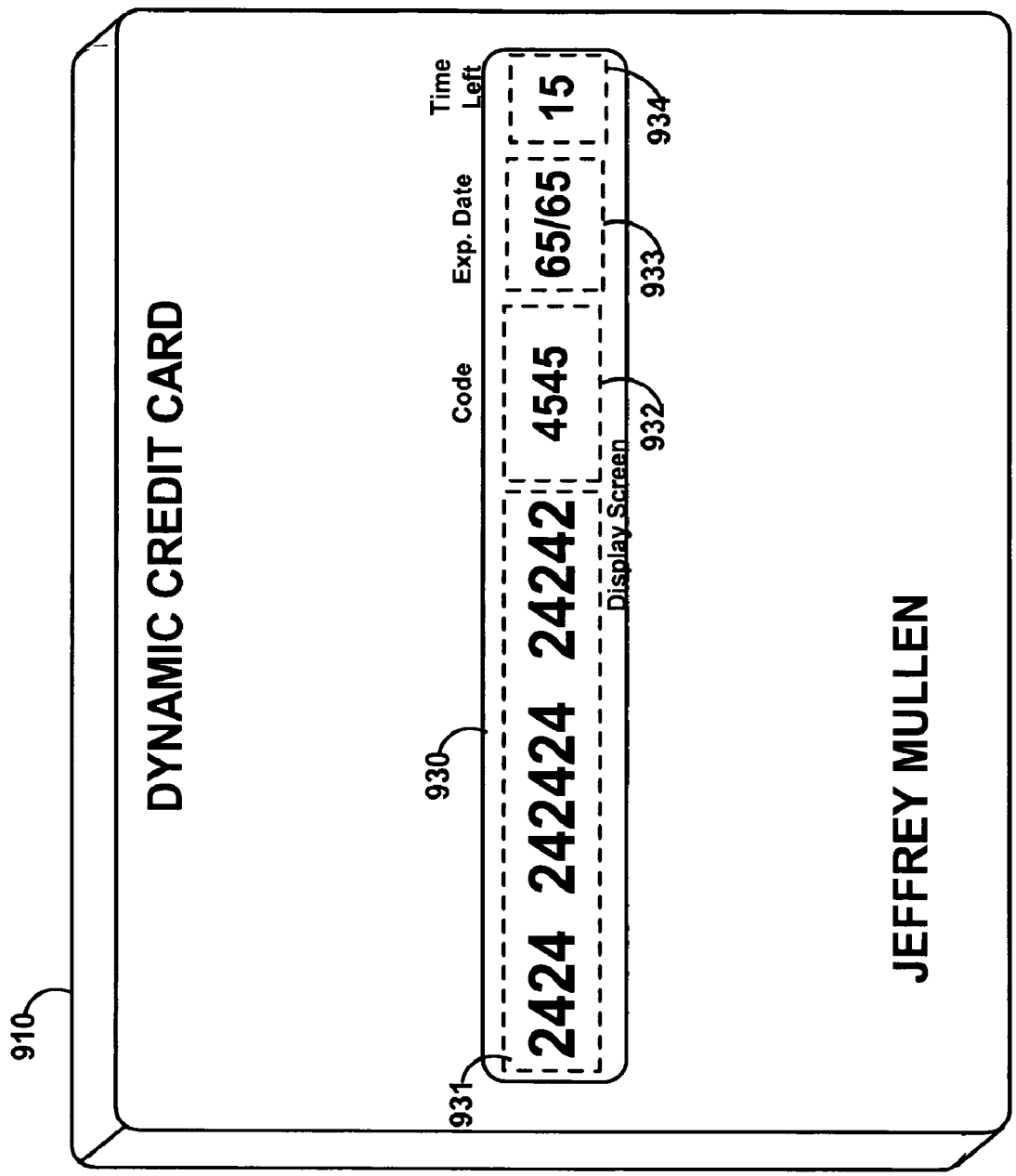
FIG. 9 is an illustration of a dynamic credit card with a dynamic credit card number, security code, and expiration date constructed in accordance with the principles of the present invention.

FIG. 9 shows dynamic credit card 900 that may include display screen 931. Display screen 931 may include, for example, dynamic credit card number 931, dynamic security code 932 (e.g., a dynamic verification code), dynamic expiration date 933, and number changing information 934. Persons skilled in the art will appreciate that display screen 931 may be extended to include and display any type of information. For example, display 931 may include the name of an account holder as well as the address of the account holder. Dynamic credit card 931 may provide dynamic name and/or address information such that more information may be fed back to a processing facility when a purchase is made online. For example, instead of a user typing in the name "Jeffrey Mullen," the user may be directed to enter the name "XRE3343 KUQE8N" and the processing facility may decode such dynamic information to determine that the battery is at 30% capacity and that the credit card has not been opened.

Persons skilled in the art will appreciate that the dynamic credit card may transmit (e.g., via a user entering in information on an online website from a display or via a magnetic stripe) information indicative of the credit card being a dynamic credit card. Thus, a processing facility may receive information that the credit card is a dynamic credit card and can utilize the other received information in any way. For example, a processing facility may receive information that the credit card is a dynamic credit card and then know to utilize the received dynamic expiration date information as part of a dynamic verification code instead of an expiration date (which the system may do if, for example, information indicative of the card being dynamic is not received).

Figure 10:
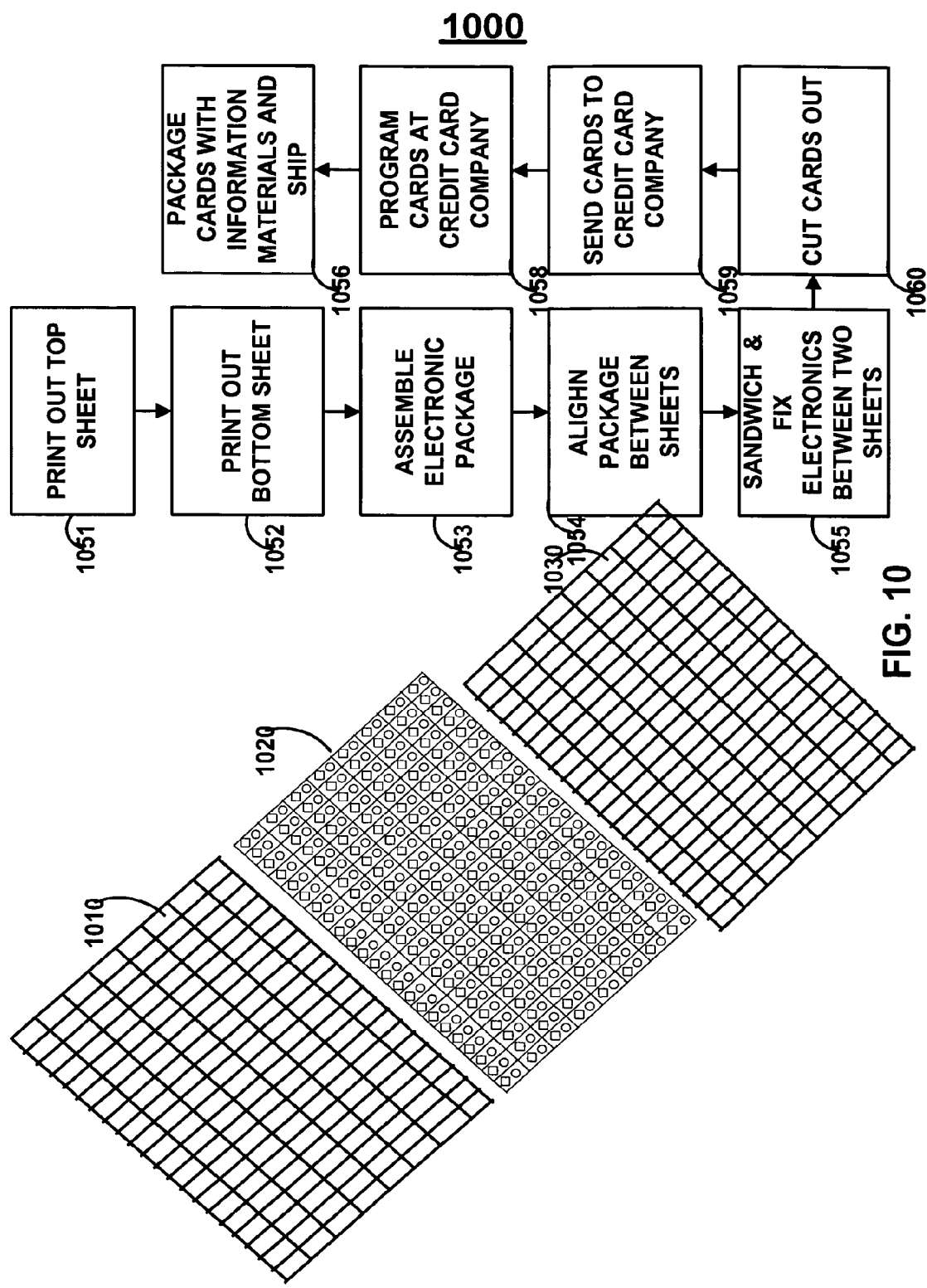
FIG. 10 is an illustration of a manufacturing process constructed in accordance with the principles of the present invention.

FIG. 10 shows manufacturing process 1000. Process 1000 may include sheet 1010, electronic packages 1020, and sheet 1030 that may be fixed together and cut to form any number of dynamic credit cards. Particularly, a sheet (e.g., a top sheet) may be fabricated and may be printed/pressed in step 1051. The bottom sheet may be fabricated and may be printed/pressed in step 1052. Electronic packages may be assembled in step 1053 and such electronic packages may be aligned with the two sheets in step 1054. The sheets and electronics may then be fixed together in step 1055. The cards may then be cut out of the fixed sheets in step 1060 and sent to credit card companies in step 1059. The cards may then be programmed at the credit card company at step 1058. For example, chips and/or memory may be programmed and then inserted into, and fixed to, the dynamic credit card in step 1058. Persons skilled in the art will appreciate that a credit card company, or any company, may receive credit cards that do not have a front faceplate on them. Thus, the credit cards may be programmed for a particular user, information about the particular user may be pressed/printed into the faceplate (e.g., the name of the user), and the faceplate may be fixed to the card after programming. The cards may be packaged with a user manual and shipped in step 1056.

Figure 11:
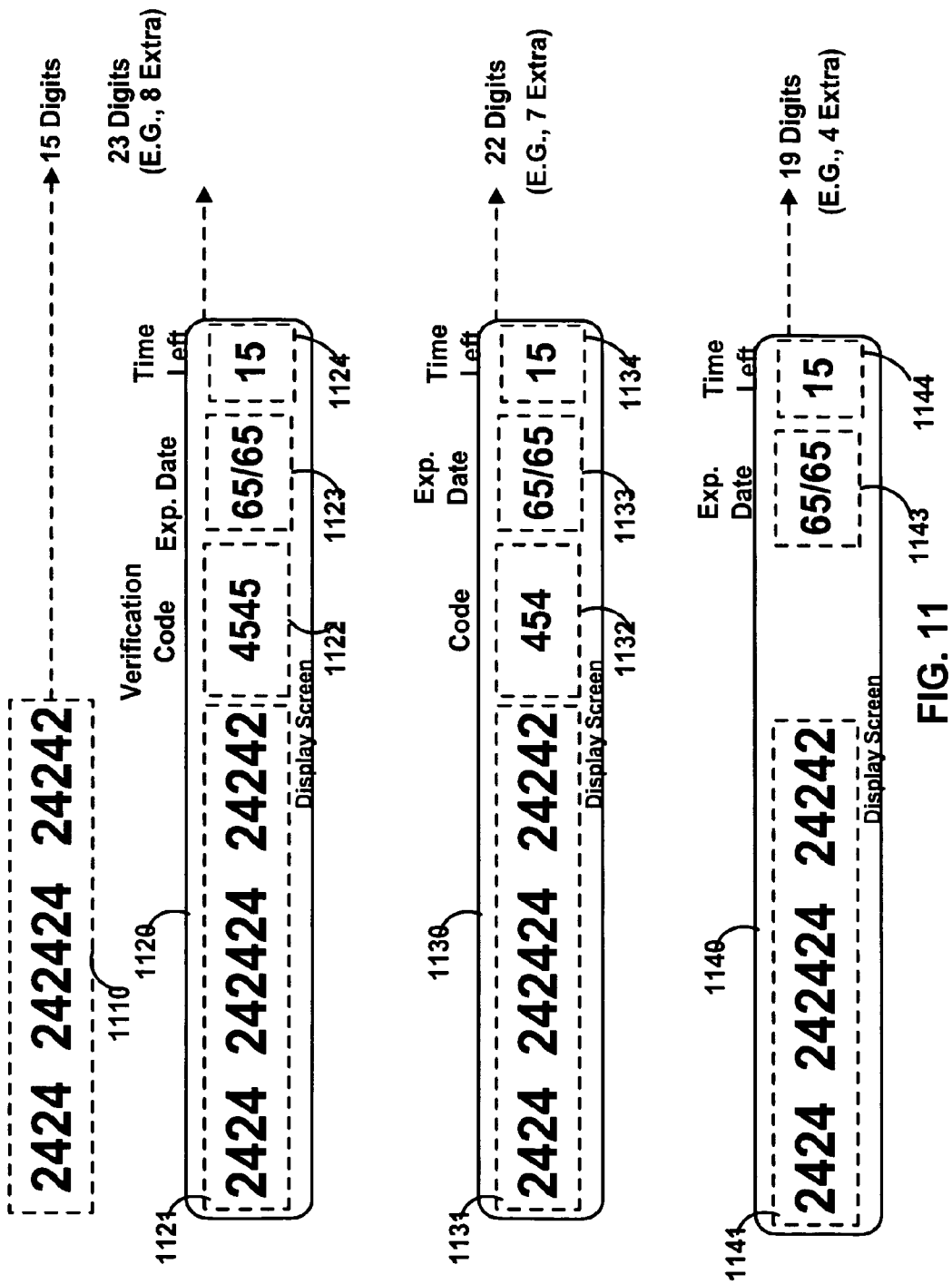
FIG. 11 is an illustration of dynamic credit cards constructed in accordance with the principles of the present invention.

FIG. 11 shows dynamic information topologies 1100. Topology 1110 may be a display that displays a fifteen digit number. Persons skilled in the art will appreciate that a credit card number may be, for example, fifteen digits in length.

Persons skilled in the art will appreciate that a number may be in any form (e.g., binary, trinary, hexadecimal, base 10, or alphanumeric).

A topology may be provided for display 120 may be provided that includes a credit card number 1121 such as a fifteen digit credit card number, verification code 1122 such as a four digit verification code, and expiration date 1123 such as a four digit expiration date. Providing information 1121-1123 as dynamic information may allow 23 digits of dynamic information to be displayed (e.g., 8 digits more than the dynamic credit card number). Timing status may be provided on display 1120 as status 1124.

Persons skilled in the art will appreciate that the extra digits may be utilized to, for example, provide identification information. Such extra digits may be encrypted using an equation known to both the credit card and the processing facility. As such, the identification information may be received from the processing facility, decrypted, and then used to retrieve information as to how the other dynamic information was coded such that the other dynamic information may be validated.

A topology may be provided for display 130 may be provided that includes a credit card number 1131 such as a fifteen digit credit card number, verification code 1132 such as a three digit verification code, and expiration date 1133 such as a four digit expiration date. Providing information 1131-1133 as dynamic information may allow 22 digits of dynamic information to be displayed (e.g., 7 digits more than the dynamic credit card number). Timing status may be provided on display 1130 as status 1134.

A topology may be provided for display 140 may be provided that includes a credit card number 1141 such as a fifteen digit credit card number and expiration date 1143 such as a four digit expiration date. Providing information 1141 and 1143 as dynamic information may allow 19 digits of dynamic information to be displayed (e.g., 4 digits more than the dynamic credit card number). Timing status may be provided on display 1140 as status 1144.

Figure 12:
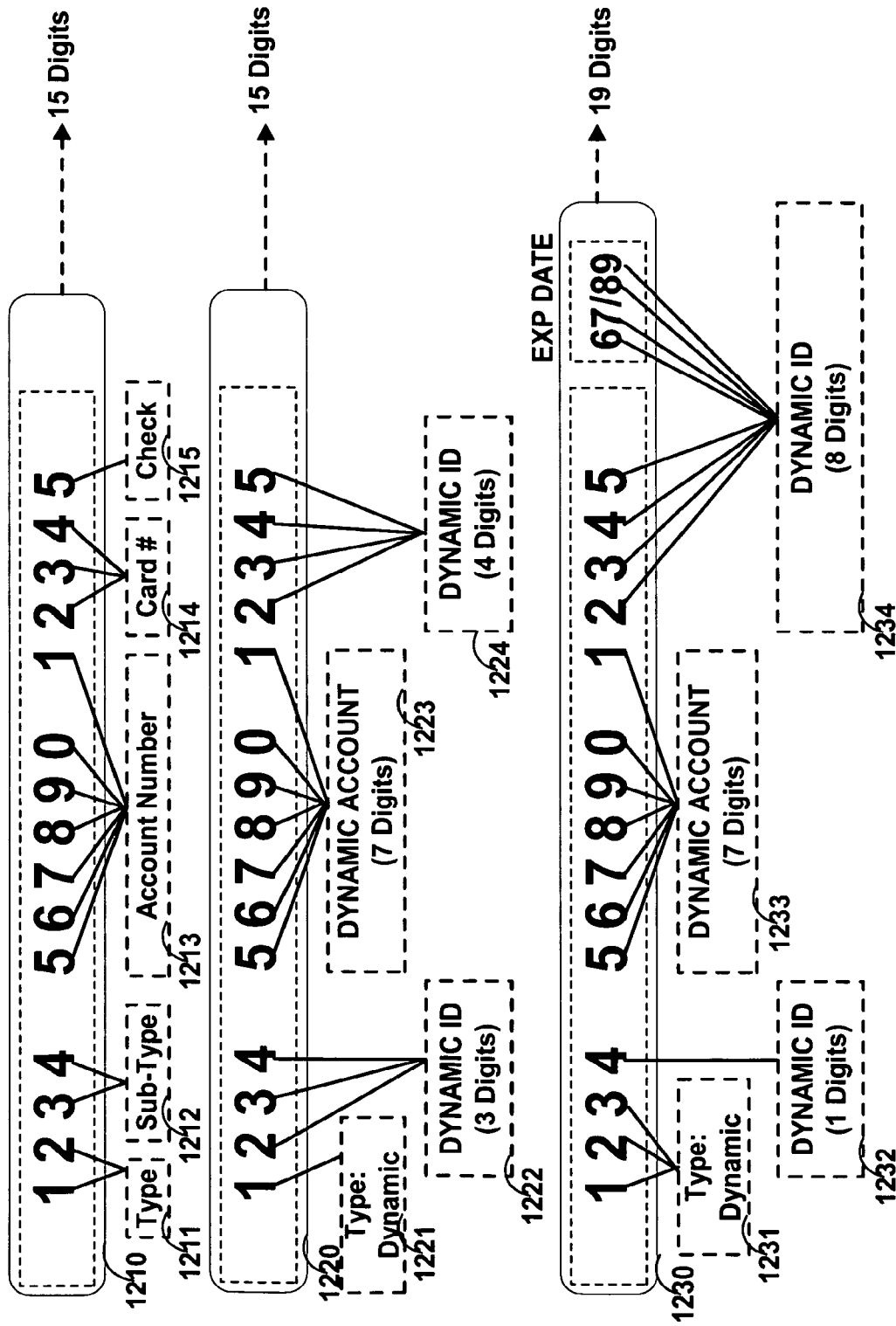
FIG. 12 is an illustration of dynamic credit cards constructed in accordance with the principles of the present invention.

FIG. 12 shows dynamic information topologies 1120. A topology may be provided in display 1210 in which a static or dynamic credit card number is provided. Such a credit card number may take many forms. For example, digits one and two may be representative of credit card type 1211 (e.g., American Express) while digits three and four may be representative of subtype 1212 (e.g., personal credit card, business credit card, American Express Blue, Airline Miles Card, Cash-back Card). Digits five through eleven may be representative of account number 1213 while digits twelve through fourteen may be representative of card number 1214 (e.g., a particular card associated to the account). The last digit of a fifteen digit dynamic or static credit card number may be indicative of check digit 1215. The check digit may be utilized to check if the number (e.g., a static credit card number displayed on a display screen) is valid by a verification process. Persons skilled in the art will appreciate that any number or information may be of any length. For example, a credit card number may be sixteen digits (or alphanumeric entries) in length. A credit card type may be a single digit (e.g., the binary equivalent of a single digit). An account number may be nine digits in length. Persons skilled in the art will also appreciate that certain types of information do not have to be included. For example, a check digit may not be included in a dynamic credit card (as the dynamic number may be a check). Similarly, a subtype may not be included. For example, only a dynamic credit card number and identification information may be provided.

A topology may be provided in display 1220 in which a dynamic credit card number is provided that includes type 1221, identification portions 1222 and 1224 and account portion 1223. Persons skilled in the art will appreciate that a credit card number may be received by a credit card processing facility and the processing facility may determine if the number is a static number or a dynamic number based on number type 1221.

For example the processing facility may look at the first digit of the credit card number and use this first digit to determine if the card is a dynamic credit card, a Visa card, a Mastercard, or an American Express card. Similarly, the processing facility may look at the first two digits of the credit card number to determine if a dynamic or static credit card number has been received. The credit card processing facility may then, for example, validate the received number according to type 1221. For example, if type 1221 is indicative of a static credit card number, than the facility (or a card reader) may use a validation process associated with the static type. Furthering the example, a different static or dynamic type may be provided for different credit card companies. Thus, one type may be indicative of American Express dynamic information while another type may be indicative of Visa dynamic information. A facility (e.g., a remote server) may then utilize the appropriate verification process for a particular type or the facility (or an online shopping store) may communicate the number (as well as, for example, a time stamp) to the appropriate processing facility (e.g., a processing facility associated to the determined type. Persons skilled in the art will appreciate that a dynamic number can take any form and does not have to follow any standard. The processing facility (or credit card reader or online store) simply has to be able to recognize that a number is dynamic and then utilize the numbering structure, if any, associated to a dynamic number (e.g., a particular type of dynamic number). Thus, a dynamic credit card number may be in a form different from a static credit card number. As shown the topology of display 1220 may be fifteen digits in length and the account number and dynamic identification number may be the same length (e.g., seven digits). Thus a credit card reader or processing facility that is operable to read and transmit a credit card number of a particular length (e.g., fifteen digits) does not have to be modified—fifteen digits are still being transmitted. Persons skilled in the art will appreciate that dynamic identification portions 1222 and 1224 may be located adjacent to one another and that identification portions 1222 and 1224 may be a static (or dynamic number). Identification information may be, for example, encrypted using a simple equation (e.g., the same equation for every credit card) and may simply be used to identify the account holder such that the dynamic account number (e.g., number 1223) may be verified based on information associated with the user. Persons skilled in the art will appreciate that a user may be identified online using his/her name and/or address and a user may be identified through a magnetic stripe transmission through identification information stored on a magnetic strip.

A dynamic identification information may have a lookup table where each time period has an entry for how to encrypt the identification information. Such a lookup table may be common to all credit cards and processing facilities such that every identification number can be decoded in the same way. Thus, every identification number from a set of credit cards (e.g., American Express credit cards) may change, but each identification number may be unique identified using only the same coding/decoding algorithm or scheme.

A topology may be provided in display 1230 in which a dynamic credit card number is provided that includes type 1231, dynamic identification portions 232 and 1234 and dynamic account portion 1233. Dynamic identification information may be longer, or shorter, than dynamic account information (e.g., dynamic information utilized to verify a credit card number or an identification number). Identification numbers may be associated to a particular card such that, for example, a nine digit identification number can be utilize to provide 999,999,999 credit cards (if 000,000,000 is used as an identification number then 1,000,000,000 credit cards may be made).

Persons skilled in the art will appreciate that an expiration date may be provided as a dynamic number. Thus, a processing facility (or remote server) may recognize that a number is dynamic and, therefore, not utilize the expiration date information as information indicative of the expiration date but may utilize the expiration date as information associated to something else (e.g., a dynamic identification number that forms part of a dynamic credit card number). Any number provided on any display may be written to a magnetic stripe such that the number may be read by conventional credit card readers. Display 11230 may provide nineteen digits by using a dynamic expiration date. Nineteen digits may also be provided without using a dynamic expiration date (e.g., by using a four digit dynamic verification code).

Figure 13:
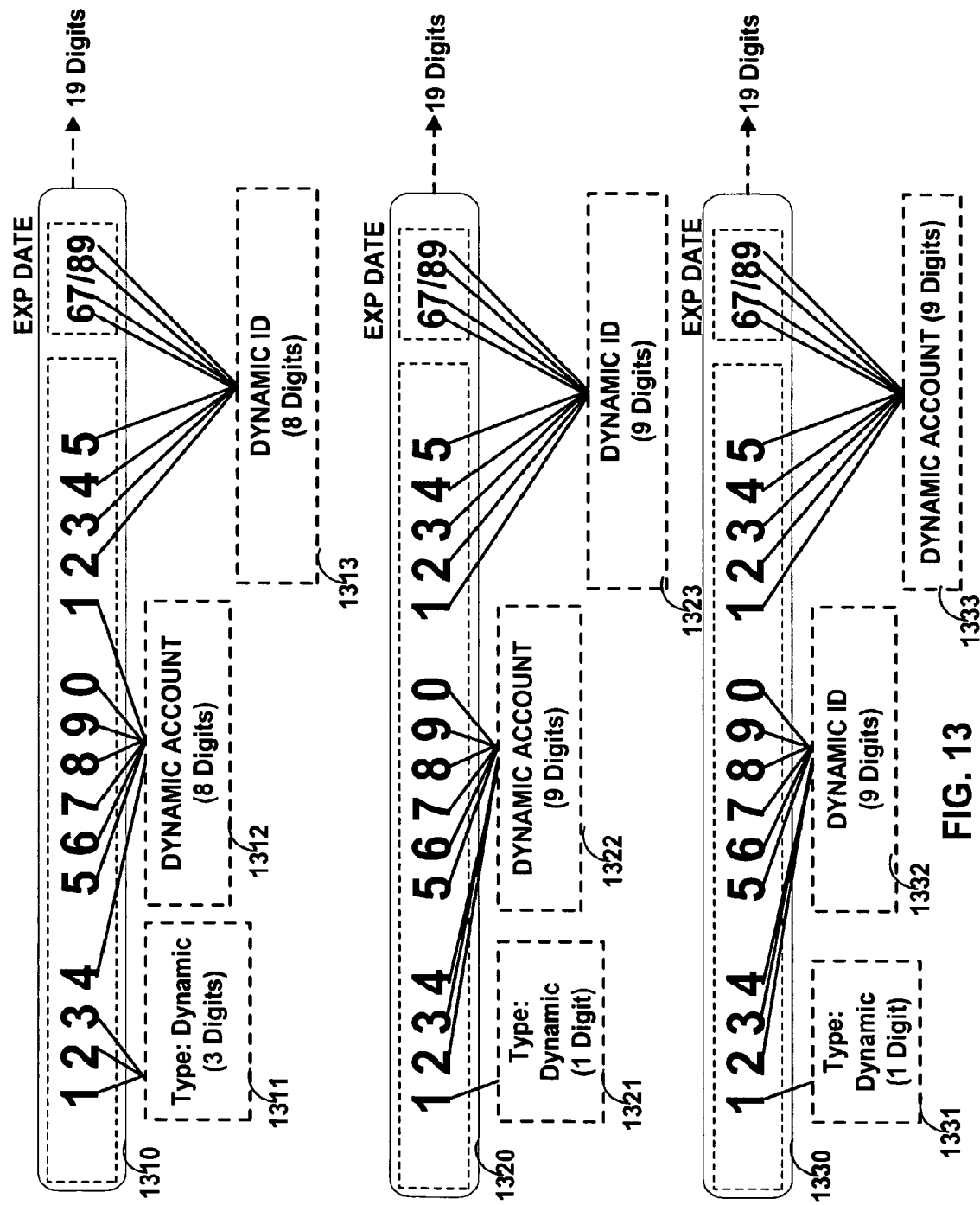
FIG. 13 is an illustration of dynamic credit cards constructed in accordance with the principles of the present invention.

FIG. 13 shows dynamic information topologies 1300. A topology may be provided in display 1310 in which type information 1311, dynamic information 1312, and dynamic information 1313 is provided. A topology may be provided in display 1320 in which type 1321, dynamic information 1322, and dynamic information 1323 may be provided. A topology may be provided in display 1330 in which type 1331, dynamic information 1332, and dynamic information 1333 may be provided.

Figure 14:
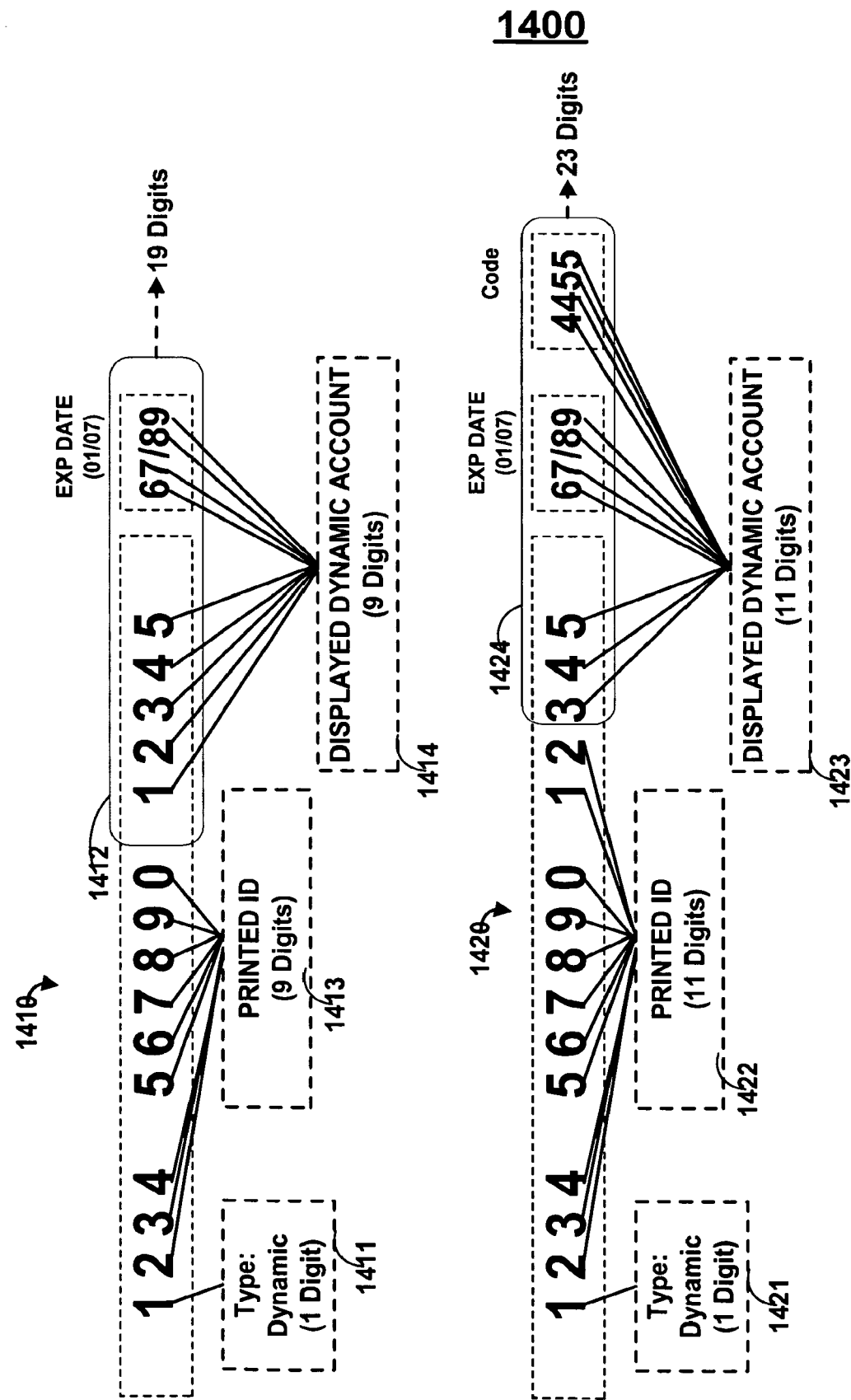
FIG. 14 is an illustration of dynamic credit cards constructed in accordance with the principles of the present invention.

FIG. 14 shows topologies 1400 that may include topology 1410 and 1420. Topology 1410 may include static information (e.g., static type 1411 and static information such as identification information 1413) and a display 1412 that may include dynamic information such as dynamic information 1414). If an expiration date is dynamic, the actual expiration date may be printed on the card so that the user knows the cards expiration date. As long as some data is dynamic, a type may be dynamic. Alternatively, if a credit card information is a combination of dynamic and static information then a hybrid type may be utilized.

Topology 1420 may be provided that includes static information such as type 1421, information 1422, and dynamic information 1423 displayed on display 1423. Persons skilled in the art will appreciate that a static verification code may be printed on the credit card as well as provide a dynamic number (e.g., a dynamic number used for something other than a verification code). Additional digits may also be utilized to feed information back to a processing facility (e.g., a credit card company). Additional information may also be embedded into a number. Persons skilled in the art will appreciate that if identification information is eleven digits in length, then 99,999,999,999 credit card may be made (if 00,000,000,000 is used as an identification number then 100,000,000,000 credit cards may be made).

Persons skilled in the art will appreciate that the type of the credit card may be static (e.g., printed on a credit card) such that the type of the credit card does not change. Such a type may be indicative of a dynamic credit card (e.g., a dynamic credit card, a Visa dynamic credit card, or an American Express dynamic credit card) such that a credit card reader (or processing facility) can easily identify the type of the card.

Figure 15:
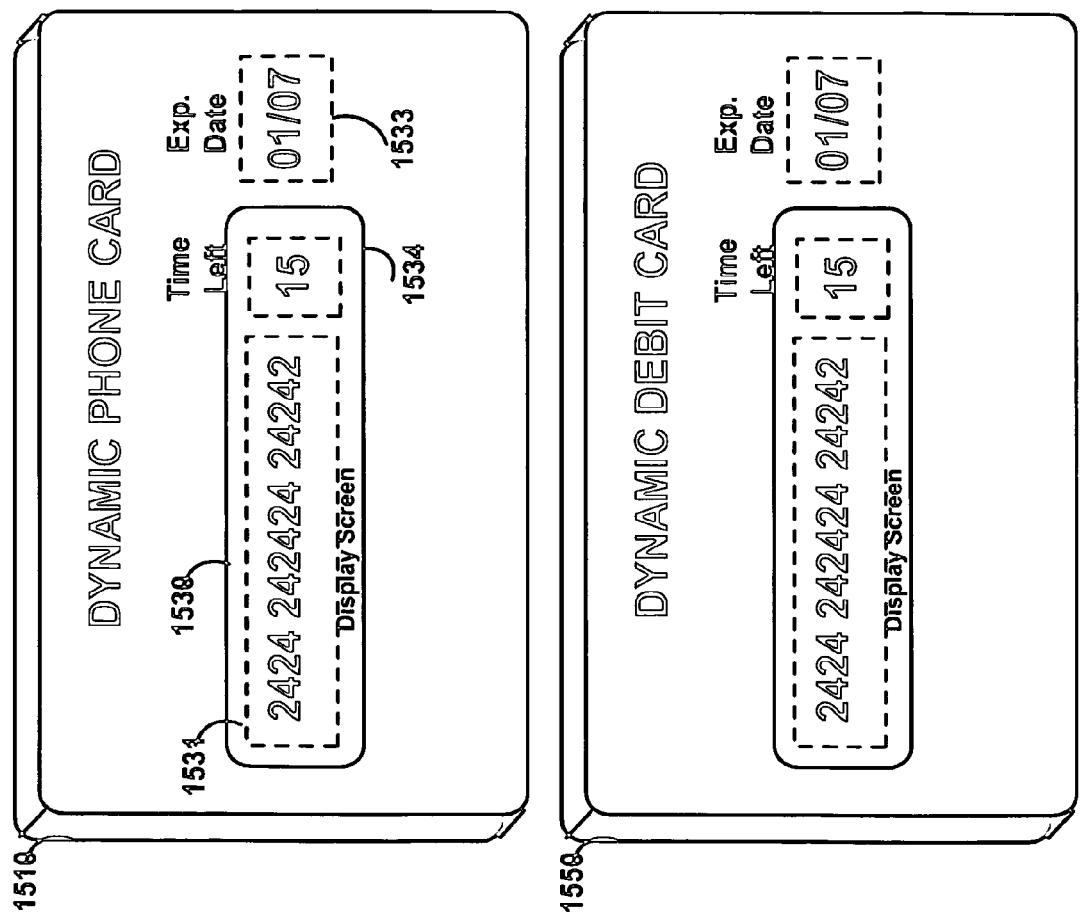
FIG. 15 is an illustration of dynamic cards constructed in accordance with the principles of the present invention.

FIG. 15 shows dynamic cards 1500 that may include dynamic phone card 1510 and dynamic debit card 1550. Dynamic phone card 1510 may include display 1530 that may include a dynamic phone card number 1531 and timing information 1534 as well as expiration date 1533 or any other type of static or dynamic information. Dynamic debit card 1550 may include any variety of dynamic information on a display or static information printed/pressed into debit card 1550.

Figure 16:
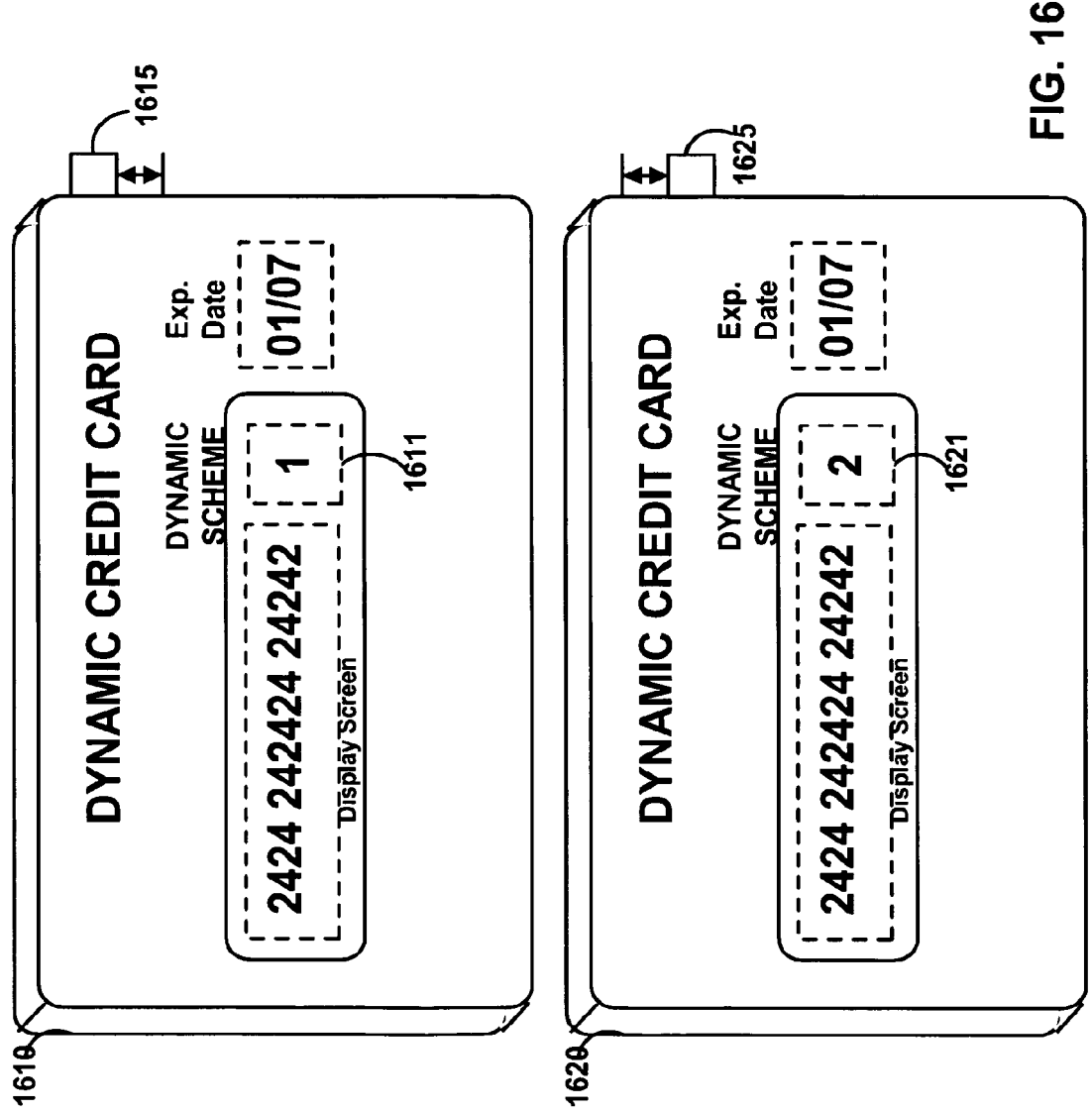
FIG. 16 is an illustration of a dynamic card with multiple coding schemes constructed in accordance with the principles of the present invention.

FIG. 16 shows dynamic credit cards 1600 that may include dynamic credit cards 1610 and 1620. A dynamic credit card may include any number of dynamic coding schemes that may be changed by, for example, manual control 1615. The dynamic coding scheme that is being utilized by a credit card may, for example, be displayed as scheme information 1611. Thus, a credit card company may keep information for different schemes in different locations. If the information is stolen from one of these locations, the credit card company can instruct users to change the coding scheme to a particular scheme. Thus, stolen numbers may not cause any fraudulent use to occur while letting users utilize the same dynamic credit card. Thus, a user may interact with switch 1615 (e.g., display the switch to location 1625 and information representative of the new dynamic scheme may be provided on a display as scheme information 1621 on dynamic credit card 1620. Scheme information may also be, for example, embedded into a dynamic number or written to a magnetic stripe.

Figure 17:
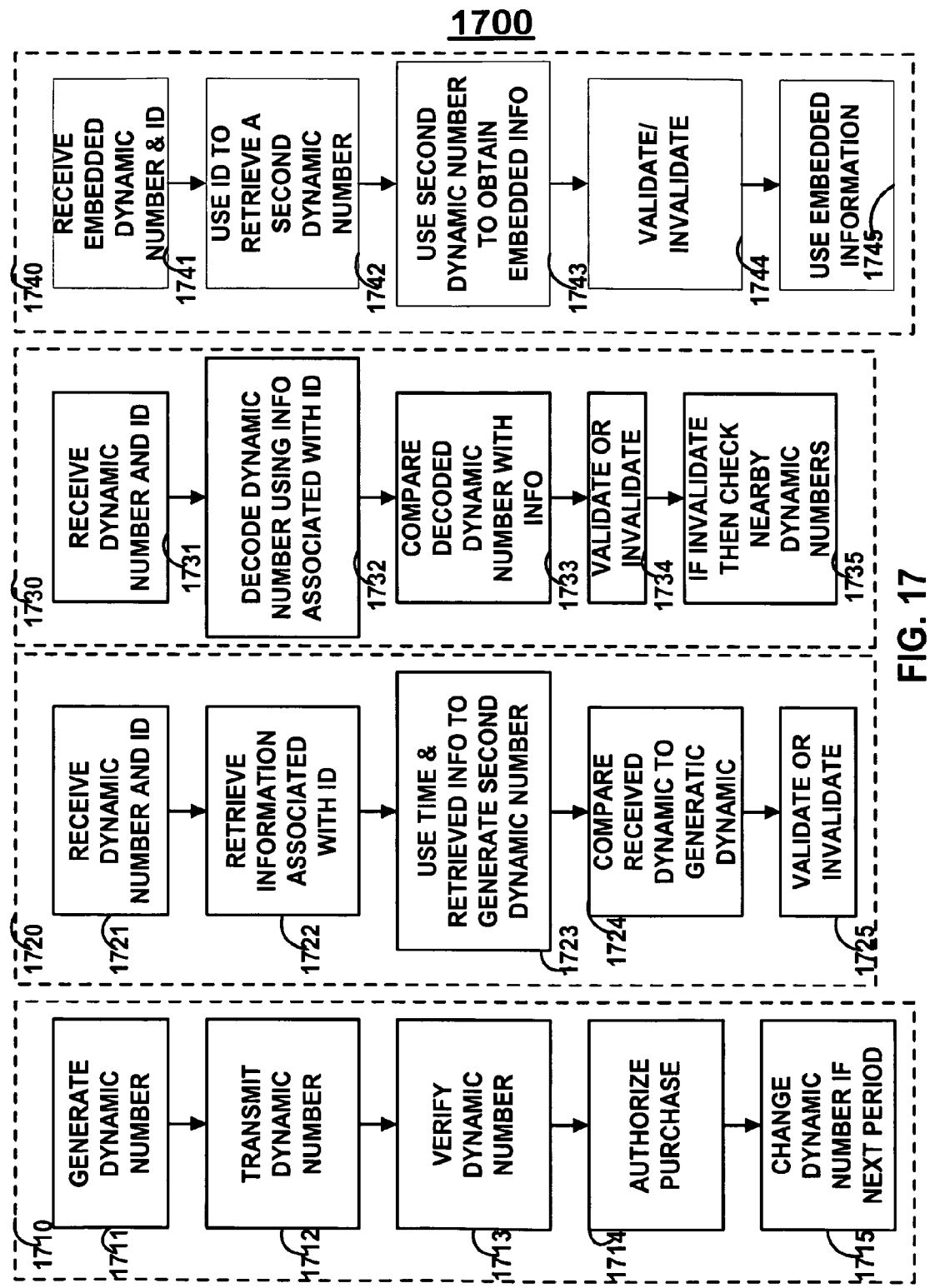
FIG. 17 is an illustration of process flow charts constructed in accordance with the principles of the present invention.

FIG. 17 shows flow charts 1710, 1720, 1730, and 1740. Flow chart 1710 may include step 1711 during which a dynamic information (e.g., a dynamic credit card number, dynamic verification code, or other dynamic number may be generated). This dynamic information may be transmitted in step 1712 (and may be transmitted with static information such as the name of the account holder or identification information such as an account number). Transmission may take the form of writing information to a magnetic stripe or displaying information on a display such that a user can enter the information in the checkout/payment stage of an online shopping process (or read the information over the phone to another person). The dynamic information (e.g., the dynamic number) may be verified in step 713 and the purchase may be authorized in step 1714. The dynamic number may then change (e.g., a new dynamic number may be generated) in step 1715. Persons skilled in the art will appreciate that dynamic numbers may be utilized for more than just payment. Dynamic numbers may be utilized for identifying a person (e.g., a dynamic number may be provided on a driver's license or passport).

Flow chart 1720 may include step 1721 in which a facility received dynamic information, such as a dynamic number, and identification information, such as a static identification number. Persons skilled in the art will appreciate that a dynamic number may change (e.g., periodically) while a static number may be constant (e.g., printed/pressed onto a plastic card or punched through a plastic card). The identification information (e.g., static identification information) may be utilized in step 1722 to retrieve information associated with the identification information. Such information may include information regarding how the dynamic credit card number was generated/coded. Thus, the receiving facility (e.g., a processing/authorization server) may utilize the retrieved information to confirm that the dynamic information (e.g., a changing credit card and/or verification number) is valid. As in one example, step 1723 may use the time the dynamic information is received (or the time the dynamic information was transmitted or time information received indicative of the time the dynamic information was generated) to generate dynamic information in step 1723. The dynamic information received by the processing facility and the dynamic information generated by the processing facility may be compared in step 1724 to validate or invalidate a purchase, or the dynamic information, in step 1725.

Flow chart 1730 may include step 1731 during which dynamic information and identification information may be received. The dynamic information may be decoded using information associated with the received identification information in step 1732. The decoded dynamic information may then be compared with information associated to the identification information (e.g., a private credit card number or a private verification code) in step 1733 such that a purchase may be validated in step 1734. If the received dynamic information is invalid then nearby dynamic information may be checked in step 1735. For example, the dynamic information for adjacent and nearby time periods may be processed. Any information at any point of a process may be stored in a buffer or memory in the processing facility (or a dynamic credit card).

Flow chart 1740 may include step 1740 during which dynamic information is received that is embedded with additional information. Identification information may also be received in step 1741. The identification information may be utilized at the processing/authorization facility to retrieve dynamic information at step 1742 (e.g., may be utilized retrieve dynamic information for a particular time period) and this retrieved dynamic information may be compared with the received dynamic information to determine any differences. The differences may then be checked, for example, against stored data (e.g., one or more tables) to see if the difference is representative of any additional information (e.g., the difference is indicative of a low battery or a card that has been tampered with). Thus, the difference may be used to validate a purchase as numerous values (e.g., the supermajority of values) for a difference may not correlate to a state. Purchases/dynamic information may be validated in step 1744 and the embedded information may be utilized in step 1745 (e.g., a new battery or card may be sent to a user if a low battery condition is determined from the embedded information).

Figure 18:
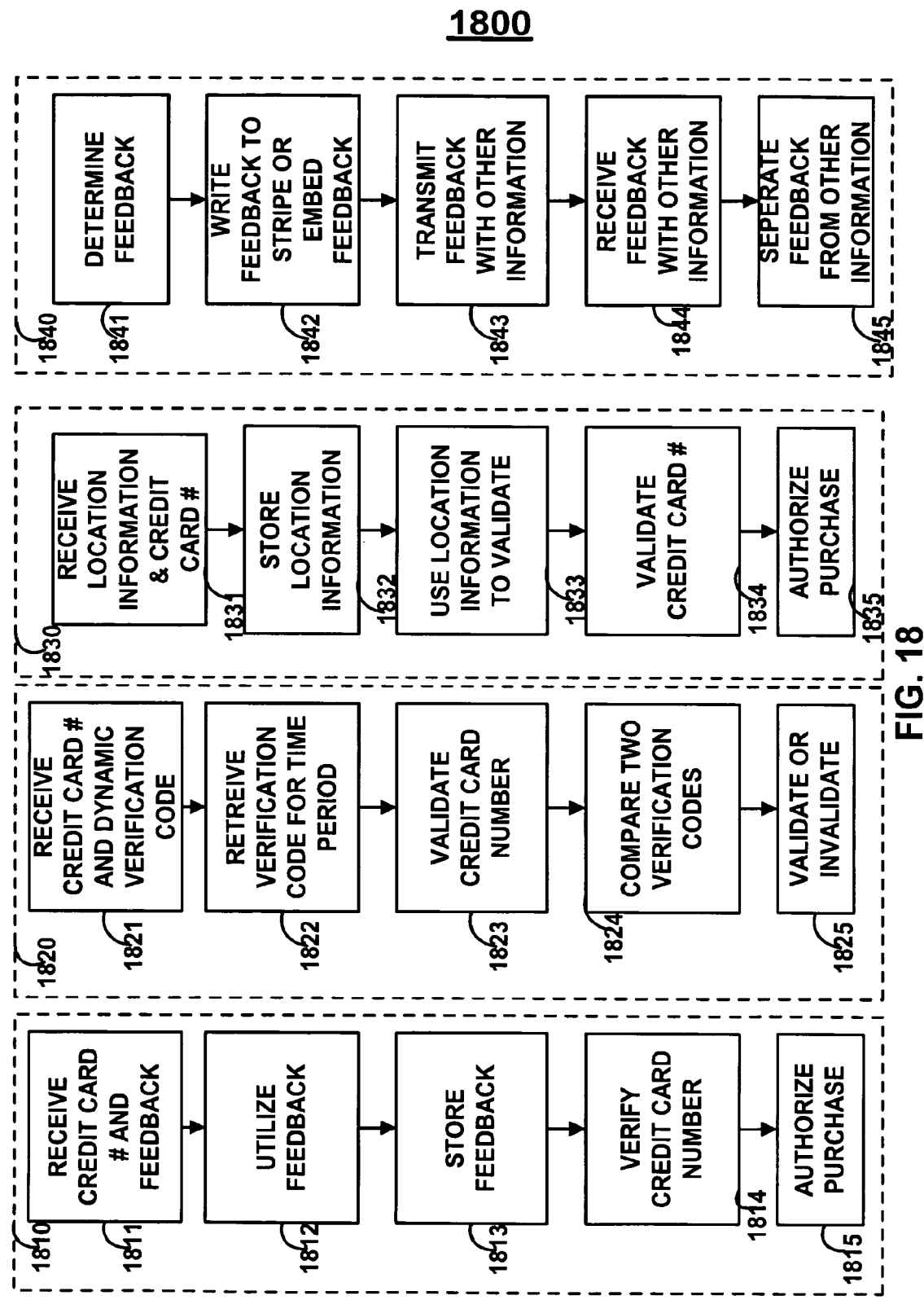
FIG. 18 is an illustration of process flow charts constructed in accordance with the principles of the present invention.

FIG. 18 shows flow charts 1800 that may include flow charts 1810, 1820, 1830, and 1840. Flow chart 1810 may include receiving a credit card number (or any static or dynamic information) and feedback in step 1811. Feedback may take the form of embedded feedback (e.g., in either a number displayed on a display or written to a magnetic stripe) or additional information written to a magnetic stripe. The feedback may be utilized in step 1812 and stored in 1813. The credit card number (e.g., a static or dynamic credit card number) may be verified in step 1814 along with any other validation steps (e.g., the validation of a static or dynamic verification code) and purchases may be authorized in step 1815.

Flow chart 1820 may include the reception of, for example, a static credit card number and a dynamic verification code in step 1721. The verification code may be verified in step 1823. Such verification may take the form of, for example, retrieving/generating/decoding the verification code for a particular time period and may be included in step 1822. Persons skilled in the art will appreciate that dynamic information does not have to be generated by a remote facility and compared to received dynamic information. Numerous entries of dynamic information may be, for example, stored in the remote facility and the relevant entry may be retrieved (e.g., the entry associated to a particular time) and compared to the received dynamic information (e.g., in step 1824). The credit card number may be validated in step 1823 and the purchase may be validated in step 1825 (e.g., after the verification code is validated). Person skilled in the art will appreciate that both the verification code and the credit card may be validated at the same time (e.g., combined into one number and validated).

Flow chart 1830 may include receiving location information and credit card information in step 1831. The location information that is received may be stored in step 1832 (e.g., stored on a remote server). The location information may be utilized to validate the received credit card information in step 1833 (or may be utilized for another purpose such as to track a user). The credit card number may be validated in step 1834 and a purchase may be authorized in step 1835.

Flow chart 1840 may include step 1841 during which feedback may be determined (e.g., by a dynamic credit card), the feedback may be written to a magnetic stripe or embedded into a number (e.g., embedded into a dynamic number such as a dynamic number displayed on a display and/or written to a magnetic stripe). The feedback may then be transmitted with other information (e.g., dynamic and static information) in step 1843 and received (e.g., by a remote server or processing/authorization facility) in step 1844. The feedback may be separated from the other information in step 1845.

Persons skilled in the art will appreciate that a credit card may communicate wireless with a credit card reader and/or a processing facility. For example, a credit card may have a device that may transmit information (e.g., dynamic information such as dynamic credit card information) wirelessly to a reader/facility. Similarly, a device may be provided in which a reader and/or facility may read information wirelessly from the device. Any information that is provided to a display or that is communicated through a magnetic stripe may be communicated through such a device. As such, a person may take a dynamic credit card and simply place the card in the proximity of a reader (e.g., a few inches or feet away from the reader) and credit card information may be communicated from the credit card to the reader. Similarly, information may be wirelessly fed back from a reader into a credit card (e.g., to update software or add new dynamic coding information/schemes). Such a reader may read the dynamic credit card and then prompt a user (or administrator) that information needs to be communicated back to the credit card. Thus, a device operable of communicating wirelessly (e.g., operable of being wirelessly read or operable to wirelessly transmit) may be operable to wirelessly receive data (e.g., wirelessly read data from a reader or wirelessly receive data transmitted from a reader). Wireless communications may take the form of, for example, electromagnetic-based, sound-based, light-based, infrared-based, and/or capacitive-based communications.

Persons skilled in the art will appreciate that a dynamic number may be limited to only one use and, as such, that a dynamic number (e.g., a dynamic credit card number or verification code) may not repeat for the life of a dynamic credit card (e.g., 1 to 5 years).

Persons skilled in the art will appreciate that a magnetic stripe may be a device that is operable of being read by a magnetic stripe reader. Circuitry may be provided to program such a device. Similarly, an encoder may be utilized to program/encode a magnetic stripe (e.g., write to a track such as a read/write track on a magnetic stripe having multiple tracks).

Persons skilled in the art will also appreciate that the present invention is not limited only the embodiments described. Instead, the present invention more generally involves changing the number of a credit card so that the number cannot be copied and used at a later time (e.g., an hour later). For example, memory may be included in a dynamic credit card that stores a table having a Y-bit key for each number of X-bit states. The X-bit states may be associated to a counter. Thus, every time the counter increments, a different Y-bit key may be looked up. The credit card processing/authorization facility may include the exact same table and the key and counter number may be sent to the facility for authorization. Thus, the facility simply has to check its own replica of the table to see if the number is valid. Such keys could be dynamic credit card numbers while the counters are security codes. All such modifications are within the scope of the present invention, which is limited only by the claims that follow.

What is claimed is:

1. A payment card comprising:
a first payment card layer;
a magnetic stripe;
a second payment card layer having an aperture, wherein circuitry is provided in said aperture and said first layer is fixed to said second layer;
a third payment card layer fixed to said second layer;
a magnetic stripe writer, wherein said magnetic stripe writer is operable to change data provided on said magnetic stripe; and
a display coupled to said circuitry.

2. The payment card of claim 1, wherein said first, second, and third layers form a housing and a manual switch is provided that extends from said housing.

3. The payment card of claim 1, wherein said first layer is printed with information.

4. The payment card of claim 1, wherein said first layer is pressed with information.

5. The payment card of claim 1, further comprising a battery provided in said aperture.

6. The payment card of claim 1, further comprising a clock provided in said aperture.

7. The payment card of claim 1, further comprising a memory, wherein said memory is programmed after said first layer is fixed to said second layer and said third layer is fixed to said second layer.

8. The payment card of claim 1, further comprising a protective layer, wherein said magnetic stripe is provided between said third layer and said protective layer.

9. The payment card of claim 1, wherein said circuitry includes a processor.

10. A method comprising:
providing a sheet of payment cards comprising:
providing a first sheet layer;
providing a second layer;
providing electronic packages between said first and second layers, wherein each one of said electronic packages includes a battery, processor, and a display, wherein a first surface of said processor is covered by said first layer and a second surface of said processor is covered by said second layer; and
cutting said sheet of payment cards into a plurality of payment cards.

11. The method of claim 10, wherein said plurality of payment cards are shipped to a facility and said plurality of payment cards are programmed at said facility.

12. The method of claim 10, wherein a payment card of said plurality of payment cards is packaged with a user manual and shipped.

13. The method of claim 10, wherein each one of said electronic packages includes a memory.

14. The method of claim 10, wherein each one of said electronic packages includes a receiver for receiving wireless information signals.

15. The method of claim 10, wherein each one of said electronic packages includes a clock.

16. The method of claim 10, wherein each one of said electronic packages includes a second display.

17. The method of claim 10, wherein the front of each one of said plurality of payment cards includes printed information.

18. The method of claim 10, wherein the front of each one of said plurality of payment cards includes pressed information.

19. The method of claim 10, wherein each one of said electronic packages includes a device operable to emit magnetic-based fields operable to be read by a magnetic stripe reader.

20. A payment card comprising:
a first payment card layer;
a second payment card layer; and
an electronics package, wherein said electronics package is provided between said first and second layer, said electronic package includes a display, a battery, a processor, and a device operable to communicate data, based at least in part on control signals from said processor, to a magnetic stripe reader, wherein a first surface of said processor is covered by said first layer and a second surface of said processor is covered by said second layer.

21. The payment card of claim 20, further comprising a chip operable to be read by a chip reader.

22. The payment card of claim 20, wherein said electronics package includes a memory.

23. The payment card of claim 20, wherein said first layer includes a first surface having printed information.

24. The payment card of claim 20, wherein said first layer includes a first surface having pressed information.

25. The payment card of claim 20, wherein said electronics package includes a second display.

26. The payment card of claim 20, wherein said electronics package includes a wireless signal receiver.

27. The payment card of claim 20, wherein said electronics package includes a memory and a second display.

28. The payment card of claim 20, wherein said electronics package includes a memory, a second display, and a wireless signal receiver.

29. A payment card without a magnetic stripe comprising:
a first payment card layer;
a second payment card layer; and
a processor provided between said first payment card layer and said second payment card layer, wherein a first surface of said processor is covered by said first payment card layer and a second surface of said processor is covered by said second payment card layer; and
an electronic device operable to communicate to a magnetic stripe reader without said magnetic stripe, wherein said device is provided between said first payment card layer and said second payment card layer.

30. The payment card of claim 29, further comprising:
a battery; and
a display.

31. The payment card of claim 29, wherein said first layer is printed with information.

32. The payment card of claim 29, further comprising a wireless signal receiver.

33. The payment card of claim 29, further comprising a clock.

34. The payment card of claim 29, further comprising a memory.

* * * * *